United States Patent [19]
Douceur et al.

[11] Patent Number: 5,903,917
[45] Date of Patent: May 11, 1999

[54] METHOD AND SYSTEM FOR ALIGNMENT OF BLOCKS IN A PROGRAM IMAGE

[75] Inventors: John R. Douceur, Bellevue; Robert P. Fitzgerald, Redmond; John W. Miller, Kirkland, all of Wash.

[73] Assignee: Microsoft Corporation, Redmond, Wash.

[21] Appl. No.: 08/797,589

[22] Filed: Feb. 7, 1997

[51] Int. Cl.[6] .................................................... G06F 12/02
[52] U.S. Cl. ........................... 711/201; 711/209; 711/171
[58] Field of Search .................................... 711/165, 171, 711/173, 201, 209; 395/380, 898

[56] References Cited

U.S. PATENT DOCUMENTS 5,784,699   7/1998   McMahon et al. ...................... 711/171

*Primary Examiner*—Jack A. Lane
*Attorney, Agent, or Firm*—Seed and Berry LLP

[57] ABSTRACT

A computer system and method for aligning blocks within source program image in accordance with alignment constraints. The source program image is divided in pages. The alignment system receives an indication of which of the blocks are accessed during each time interval while the source program image is executed. The alignment system determines from the received indications which of the pages are accessed during each time interval. The alignment system then identifies the first block of the source program image that has an alignment constraint and repeats the following until all blocks have been aligned. The alignment system identifies a group of contiguous blocks that are adjacent to the identified block such that the identified blocks can be rearranged without increasing the number of pages that are accessed during each time interval. The alignment system then determines an arrangement of the blocks that tends to minimize the amount of padding that is needed to satisfy the alignment constraints. The alignment system then stores the rearranged blocks along with the padding in a destination program image.

49 Claims, 18 Drawing Sheets

| Secondary | [0] | [1] | [2] | [3] |
|---|---|---|---|---|
| | 0 | 0 | 0 | 0 — 1801 |
| | 0 | 1 | 0 | 0 — 1802 |
| | 0 | 0 | 1 | 0 — 1803 |
| | 0 | 0 | 0 | 1 — 1804 |
| | 0 | 2 | 0 | 0 — 1805 |
| | 0 | 1 | 1 | 0 — 1806 |
| | 0 | 1 | 0 | 1 — 1807 |
| | 0 | 0 | 1 | 1 — 1808 |
| | 0 | 0 | 0 | 2 — 1809 |
| | 0 | 3 | 0 | 0 |
| | 0 | 2 | 1 | 0 |
| | 0 | 2 | 0 | 1 |
| | 0 | 1 | 1 | 1 |
| | 0 | 1 | 0 | 2 |
| | 0 | 0 | 1 | 2 |
| | 0 | 0 | 0 | 3 |
| | 0 | 3 | 1 | 0 |
| | 0 | 3 | 0 | 1 |
| | 0 | 2 | 1 | 1 |
| | 0 | 2 | 0 | 2 |
| | 0 | 1 | 1 | 2 |
| | 0 | 1 | 0 | 3 — 1821 |
| | 0 | 0 | 1 | 3 |
| | 0 | 3 | 1 | 1 |
| | 0 | 3 | 0 | 2 |
| | 0 | 2 | 1 | 2 |
| | 0 | 2 | 0 | 3 |
| | 0 | 1 | 1 | 3 |
| | 0 | 3 | 1 | 2 |
| | 0 | 3 | 0 | 3 |
| | 0 | 2 | 1 | 3 |
| | 0 | 3 | 1 | 3 |

*Fig. 18*

METHOD AND SYSTEM FOR ALIGNMENT OF BLOCKS IN A PROGRAM IMAGE

TECHNICAL FIELD

This invention relates to a method and system for optimizing a computer program image and, more particularly, to a method and system for rearranging blocks of the program image to satisfy alignment constraints.

BACKGROUND OF THE INVENTION

Many conventional computer systems utilize virtual memory. Virtual memory refers to a set of techniques that provide a logical address space that is typically larger than the corresponding physical address space of the computer system. One of the primary benefits of using virtual memory is that it facilitates the execution of a program without the need for all of the program to be resident in main memory during execution. Rather, certain portions of the program may reside in secondary memory for part of the execution of the program. A common technique for implementing virtual memory is paging; a less popular technique is segmentation. Because most conventional computer systems utilize paging instead of segmentation, the following discussion refers to a paging system, but these techniques can be applied to segmentation systems or systems employing paging and segmentation as well.

When paging is used, the logical address space is divided into a number of fixed-size blocks, known as pages. The physical address space is divided into like-sized blocks, known as page frames. A paging mechanism maps the pages from the logical address space, for example, secondary memory, into the page frames of the physical address space, for example, main memory. When the computer system attempts to reference an address on a page that is not present in main memory, a page fault occurs. After a page fault occurs, the operating system copies the page into main memory from secondary memory and then restarts the instruction that caused the fault.

One paging model that is commonly used is the working set model. At any instance in time, t, there exists a working set, w(k, t), consisting of all the pages used by the k most recent memory references. The operating system monitors the working set of each process and allocates each process enough page frames to contain the process' working set. If the working set is larger than the allocated page frames, the system will be prone to thrashing. Thrashing refers to very high paging activity in which pages are regularly being swapped from secondary memory into the pages frames allocated to a process. This behavior has a very high time and computational overhead. It is therefore desirable to reduce the size of (i.e., the number of pages in) a program's working set to lessen the likelihood of thrashing and significantly improve system performance.

A programmer typically writes source code without any concern for how the code will be divided into pages when it is executed. Similarly, a compiler program translates the source code into relocatable machine instructions and stores the instructions as object code in the order in which the compiler encounters the instructions in the source code. The object code therefore reflects the lack of concern for the placement order by the programmer. A linker program then merges related object code together to produce executable code. Again, the linker program has no knowledge or concern for the working set of the resultant executable code. The linker program merely orders the instructions within the executable code in the order in which the instructions are encountered in the object code. The computer program and linker program do not have the information required to make an optimal placement of code portions within an executable module. This is because the information required can in general only be obtained by actually executing the executable module and observing its usage of code portions. Clearly this cannot be done before the executable module has been created. The executable module initially created by the compiler and linker thus has code portions laid out without regard to their usage.

As each code portion is executed, the page in which it resides must be in physical memory. Other code portions residing on the same page will also be in memory, even if they may not be executed in temporal proximity. The result is a collection of pages in memory with some required code portions and some unrequired code portions. To the extent that unrequired code portions are loaded into memory by this process, valuable memory space is wasted, and the total number of pages loaded into memory is much larger than necessary.

To make a determination as to which code portions are "required" and which code portions are "unrequired," a developer needs execution information for each code portion, for example, when the code portion is accessed during execution of the computer program. A common method for gathering such execution information includes adding instrumentation code to every code portion. The execution of the computer program is divided into a series of time intervals (e.g., 100 milliseconds). Each time the code portion is executed during execution of the computer program, instrumentation code causes a flag to be set for that code portion for the current time interval. Thus, after execution of the computer program, each code portion will have a temporal usage vector associated with it. The temporal usage vector has, for each time interval, a bit that indicates whether that code portion was executed during that time interval. The temporal usage vectors therefore reflect the temporal usage pattern of the code portions.

After the temporal usage patterns have been established, a paging optimizer can rearrange the code portions to minimize the working set. In particular, code portions with similar temporal usage patterns can be stored on the same page. Thus, when a page is loaded into main memory, it contains code portions that are likely to be required.

FIG. 1 is a block diagram illustrating a sample program image that has been rearranged by a paging optimizer. The program image spans four pages (i.e., page 0–page 3) and contains 16 code portions (i.e., code portion 0–code portion 15). Current paging optimizers typically store the code portions in the program image without regard to the alignment constraints of the code portions. An alignment constraint of a code portion means that the code portion must be positioned at an address that is an integral multiple of the alignment constraint. For example, a code portion with an alignment constraint of 16 needs to be stored at an address that is an integral multiple of 16 (i.e., 0, 16, 32, 48, etc.). These alignment constraints can be required by the architecture of the processor or can be imposed to improve the performance of the computer program. In addition, data portions of a computer program can also have alignment constraints. (In the following, the term "block" is used to refer to both data portions and code portions.) For example, a floating point number may have an alignment constraint of 4 and an array of 32-byte elements may have an alignment constraint of 32. Blocks 1, 8, 11, and 14 of FIG. 1 have alignment constraints, however, the paging optimizer typically generates the program image without consideration to alignment constraints. Therefore, the blocks with alignment constraints are not necessarily properly aligned.

FIGS. 2A and 2B illustrate a typical technique for ensuring that the alignment constraints of a program image are satisfied. FIG. 2A illustrates the program image as output by the paging optimizer. Memory locations 0–127 are shown in the horizontal direction with blocks 2A01–2A15 arranged in memory by the paging optimizer. The horizontal width of a block indicates the size of the block. For example, block 2A01 has a size of 8 bytes (i.e., from address 1 to address 8), and block 2A08 has a size of 12 bytes (i.e., from address 52 to address 63). The vertical height of each block indicates its alignment constraint, as does the number within the block. For example, block 2A01 has an alignment constraint of 8 and block 2A02 has an alignment constraint of 16. Thus, the vertical height of block 2A02 is twice the vertical height of block 2A01 because the alignment constraint of block 2A02 (i.e., 16) is twice the alignment constraint of block 2A01 (i.e., 8).

FIG. 2B illustrates the program image after the alignment constraints have been satisfied. A typical technique for satisfying the alignment constraints simply scans the program image and when a block is encountered that is not properly aligned, the technique adds appropriate padding to align that block. The padding may be bytes that contain NOP instructions. Since block 2A01 has an alignment constraint of 8 and was positioned by the paging optimizer at address 1, it is not properly aligned. Therefore, the technique would add 7 bytes of padding, 2A01a, to the destination program image. (In the following, the term "source" program image refers to the program image whose alignment constraints have yet to be satisfied, and the term "destination" program image refers to the program image whose alignment constraints are satisfied.) The technique would then retrieve block 2A01 from the source program image and store it in the destination program image starting at address 8 and continuing through address 15. The technique would then retrieve block 2A02 and determine that its alignment constraint is 16 and that the next address, 16, in the destination program image is an integral multiple of 16. Therefore, the technique stores block 2A02 starting at address 16 and continuing through address 31 in the destination program image. The technique similarly stores blocks 2A03–2A04 in addresses 31–45 of the destination program image. The technique would then retrieve block 2A06, which has an alignment constraint of 8. Since the next address in the destination program image is address 46, which is not an integral multiple of 8, the technique adds 2 bytes of padding, 2A06a, so that the next address is an integral multiple of 8. The technique then stores block 2A06 starting at address 48 and continuing through address 57 in the destination program image. The technique continues in a similar way to process each block in the source destination image.

Such a technique to satisfy alignment constraints has several problems. First, the adding of padding increases the overall size of the program image. Second, and more importantly, such a technique does not take into consideration page boundaries. In particular, the paging optimizer arranged the blocks to reduce the working set, however, when padding is added, blocks stored on a certain page in the source program image may be stored on two different pages in the destination program image. Thus, when executing those blocks, both pages would need to be in memory and thus the working set would be increased.

Because of recent developments in processor architecture, the imposing of certain alignment constraints on blocks of a program image can result in significant improvements in performance. In particular, as processors have become faster, main memory access has become the bottleneck to overall increased performance. Therefore, in order to improve performance, memory caching schemes have been adopted to lessen the effect of the main memory bottleneck. The PENTIUM processor, for example, employs one such memory caching scheme that uses a very fast primary cache and a fast secondary cache. When the processor needs to read data from memory, the processor first checks the primary cache to locate the data. If the requested data is found in the primary cache, it is returned to the processor without accessing main memory. If the requested data is not found in the primary cache, then the secondary cache is checked, which has a slower access time than the primary cache, but is still much faster than main memory. If the data is located in the secondary cache, the data is returned to the processor and the line ("cache line") of the secondary cache that stored the data is copied into the primary cache. Data is stored in both the primary cache and the secondary cache in terms of 32-byte cache lines. The primary cache is 8 KB in size, so it can store 256 cache lines. The secondary cache is typically 64 KB to 512 KB, so it can store between 2,048 to 16,384 cache lines.

If after checking the secondary cache the data is still not found, main memory is accessed which has a significantly slower access time than the secondary cache. When main memory is accessed, not only the requested data, but an entire memory line of 32 bytes is returned. The processor receives the requested data, and both the primary and secondary caches receive the entire 32-byte memory line. The 32-byte memory line is stored in the caches in the hope that when the processor needs to read data from memory, the data will be found within this cache line. The memory line that is returned has a starting address that is an integral multiple of 32. That is, if data is accessed at address 42, then the memory line that is returned includes addresses 32 through address 47. To put the costs of memory access in perspective, it takes 1 processor cycle to access the primary cache, 4–12 processor cycles to access the secondary cache, and 50 processor cycles to access main memory. The PENTIUM processor's caching scheme is described in greater detail in Anderson and Shanley, *Pentium Processor System Architecture*, 2d ed., Addison-Wesley, 1995, pp. 35–60, which is hereby incorporated by reference.

It would be desirable to have a technique for satisfying the alignment constraints that would minimize the amount of padding that is added and would also minimize the effect on the working set of the computer program.

SUMMARY OF THE INVENTION

The present invention provides a computer system and method for aligning blocks of a source program image in accordance with alignment constraints. The program image is divided in pages. The alignment system receives an indication of which blocks are accessed during each time interval of an execution of the program image. A page is accessed during each time interval in which a block that it contains is accessed. The alignment system repeats the following until each block in the source program image is stored in a destination program image. The alignment system identifies a first block that has an alignment constraint and that has not yet been stored in the destination program image. The alignment system then identifies a plurality of contiguous blocks that are adjacent to the identified first block such that the identified blocks can be rearranged without increasing the number of pages accessed during each time interval. The alignment system then rearranges the identified blocks to satisfy any alignment constraints of the identified blocks. When the identified blocks contain a certain block with an alignment constraint that crosses a page boundary, the alignment system reorders the identified blocks so that the certain block no longer crosses a page boundary. The alignment system then repeats the identifying of first block and of the plurality of contiguous blocks with the reordered blocks. The reordering of the blocks so that no blocks with an alignment constraint crosses a page boundary tends to increase the number of identified blocks, thereby reducing the need for padding when satisfying the alignment constraints of the identified blocks.

To identify a large number of blocks, the alignment system identifies a forward group of blocks by first searching in the forward direction and then in the backward direction. The alignment system then identifies a backward group of blocks by first searching in the backward direction and then in the forward direction. The alignment system then selects the forward or the backward group to be rearranged depending on which group has more blocks.

To rearrange the identified blocks, the alignment system repeats the following until all identified blocks are stored in a destination program image. The alignment system selects an identified block with the largest alignment constraint that has not yet been stored in the destination program image. When the next address of the destination program image is not an integral multiple of the alignment constraint of the selected block, the alignment system chooses one or more blocks not yet stored in the destination program image and any padding necessary to make the next address an integral multiple of the alignment constraint of the selected block. The alignment system then stores the chosen one or more blocks and necessary padding in the destination program image. Finally, the alignment system stores the selected block in the destination program image. To choose the blocks and padding, the alignment system iteratively generates every possible subset of block sizes modulo the alignment constraint of the selected block that can be used to satisfy the alignment constraint of the selected block. The alignment system then determines which subset would require the minimum amount of padding to satisfy the alignment constraint of the selected block.

BRIEF DESCRIPTION OF THE DRAWINGS

FIG. 18 contains each subset of a sample array.

DETAILED DESCRIPTION OF THE INVENTION

Figure 1:
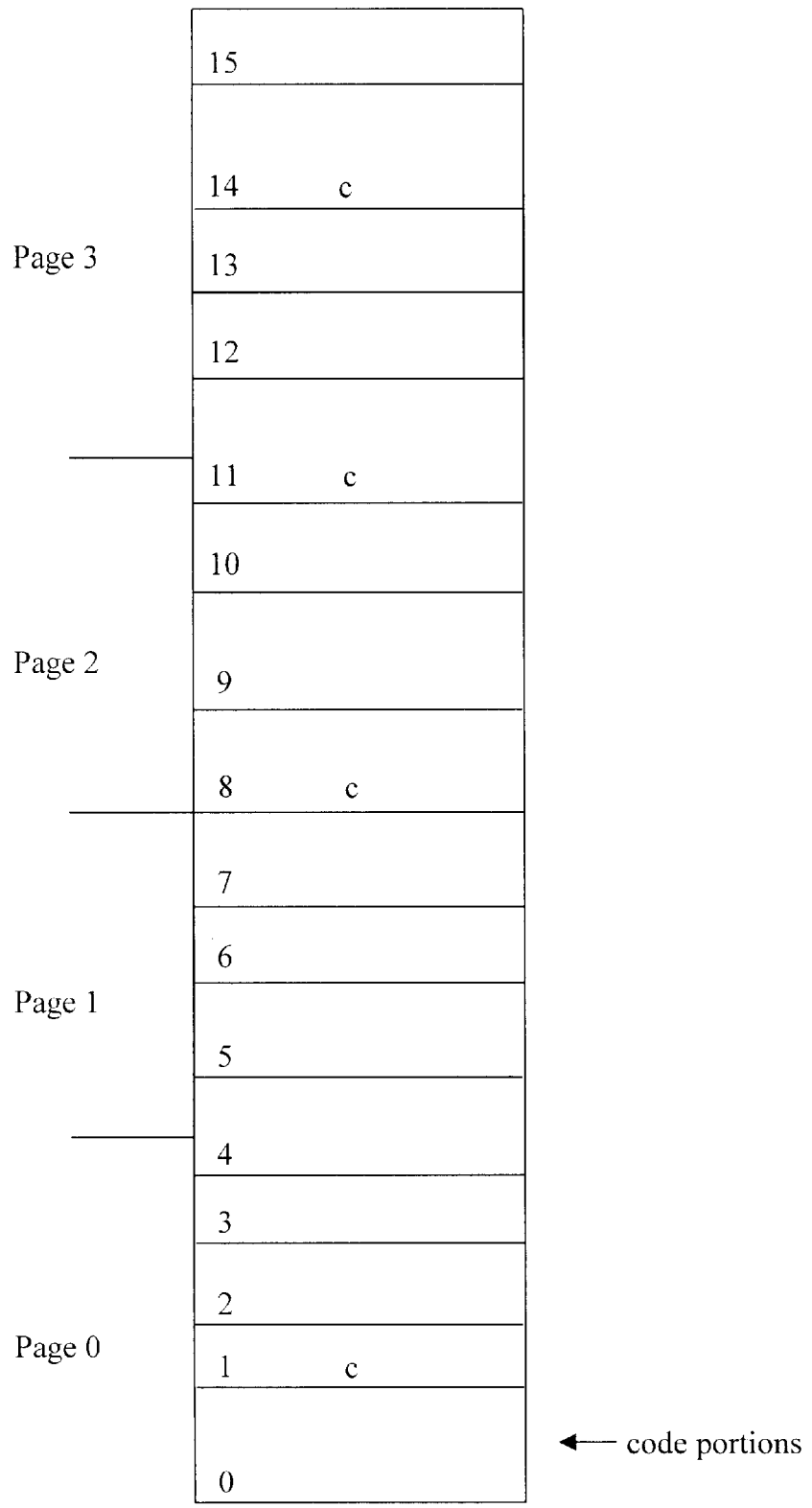
FIG. 1 is a block diagram illustrating a sample program image that has been rearranged by a paging optimizer.

The present invention provides a method and system for arranging blocks of a program image to ensure that the alignment constraint of each block is satisfied. In one embodiment, the alignment system receives a source program image along with the temporal usage pattern of each block, the alignment constraint of each block, and the page boundaries. The alignment system repeatedly selects a group of blocks that includes an alignment constrained block and blocks that both are contiguous to the alignment constrained block and can be rearranged amongst themselves without affecting the temporal usage pattern of any page. The alignment system then rearranges the blocks in the group to ensure that all the alignment constraints of the blocks in the group are satisfied. When rearranging the blocks, the alignment system determines an ordering of the blocks in the group that tends to minimize the amount of padding that needs to be added to satisfy the alignment constraints. The alignment system then stores the rearranged blocks of the group along with the padding into the destination program image. Not every block of the source program image is selected to be part of a group. Certain blocks that are not alignment constrained may not be part of a group. The alignment system stores these blocks in the destination program image in between the adjacent groups of blocks. Upon completion, the destination program image contains all blocks with alignment constraints satisfied while tending to minimize the affect on the temporal usage patterns of the pages. That is, the affect on the size of the working set is minimized.

The alignment system attempts to maximize the number of blocks that are in each group. In general, the mean amount of padding that is needed to satisfy alignment constraints of a group varies inverse-exponentially with the number of blocks in a group. For example, if a program image contains only one group of blocks that includes all the blocks of the program image, then any block can be rearranged to help satisfy an alignment constraint without affecting the temporal usage pattern of a page. However, if that program image contains two groups of blocks with each group having half of the blocks in the program image, then, by definition of a group, at least one block in the first group cannot be rearranged with a block in the second group without affecting the temporal usage pattern of a page. Thus, even though those two blocks could be rearranged to help satisfy an alignment constraint, their rearranging is impermissible because it would affect the temporal usage pattern of a page. As a result, the alignment system might need to add padding that would not be needed if all the blocks were in the same group.

The number of blocks in a group can be adversely affected by alignment constrained blocks that cross page boundaries.

When an alignment constrained block crosses an page boundary, its possible that it cannot be rearranged without affecting the temporal usage pattern of a page. For example, it may be that the temporal usage pattern of the block immediately before the cross-page block has a temporal usage pattern that is inconsistent with the temporal usage pattern of the ending page of the cross-page block. Thus, the cross-page block cannot be in the same group as the block that is immediately before the cross-block. Similarly, it may be that the temporal usage pattern of the block immediately after the cross-page block has a temporal usage pattern that is inconsistent with the temporal usage pattern of the starting page of the cross-page block. Thus, the cross-page block cannot be in the same group as the block that is immediately after the cross-page block. Therefore, a cross-page block may be in a group that includes only one block. In contrast, if a block does not cross a page, then it is in a group that includes at least each block on the same page. That is, each block that resides entirely on a page can be rearranged with the other blocks on that page without affecting the temporal usage pattern of that page. Therefore, the number of blocks in a group can be increased by reordering the blocks so that no block that has an alignment constraint crosses a page boundary. When the alignment system detects that a group includes a cross-page block that has an alignment constraint, it attempts to reorder the blocks in the group so that no block that has an alignment constraint crosses a page. If the blocks can be reordered so that such a block no longer crosses a page, then the alignment system reorders those blocks and then selects a new group of blocks starting with the first alignment constrained block in the reordered group.

The alignment system aligns the blocks in a group by selecting a rearrangement of the blocks that tends to minimize the amount of padding needed to satisfy the alignment constraints of the blocks in the group. The alignment system categorizes blocks with alignment constraints into two categories: polite and rude. A polite block is a block with a size that is an integral multiple of its alignment constraint. For example, a block with an alignment constraint of 16 bytes that is 48 bytes in size is a polite block (e.g., 48 modulo 16=0). A rude block is a block with a size that is not an integral multiple of its alignment constraint. For example, a block with an alignment constraint of 16 bytes that is 47 bytes in size is a rude block (e.g., 47 modulo 16=15). The alignment system rearranges the blocks of a group by first selecting the blocks with the largest alignment constraint. If the next address in the destination program image is not an integral multiple of the largest alignment constraint, the alignment system selects a combination of blocks in the group and padding, as appropriate, so that when stored the next address will be an integral multiple of that largest alignment constraint. The alignment system then stores that combination of blocks and padding in the destination program image. The alignment system then stores any polite block with that largest alignment constraint at the next address, which is an integral multiple of the largest alignment constraint. Since these polite blocks are integral multiples of the alignment constraint, after storing each polite block, the next address will be an integral multiple of that largest alignment constraint. The alignment system then successively selects each rude block, if any, with that largest alignment constraint. After selecting a rude block, the alignment system stores that block at the next address and selects a combination of blocks not yet stored in the destination program image and of padding to store next so that, after storing the combination, the next address will be an integral multiple of the largest alignment constraint of a block that has not yet been stored in the destination program image. After selecting and storing each rude block with that largest alignment constraint, the alignment system then repeats this process of storing polite and rude blocks that have not yet been stored with the next largest alignment constraint.

Figure 3:
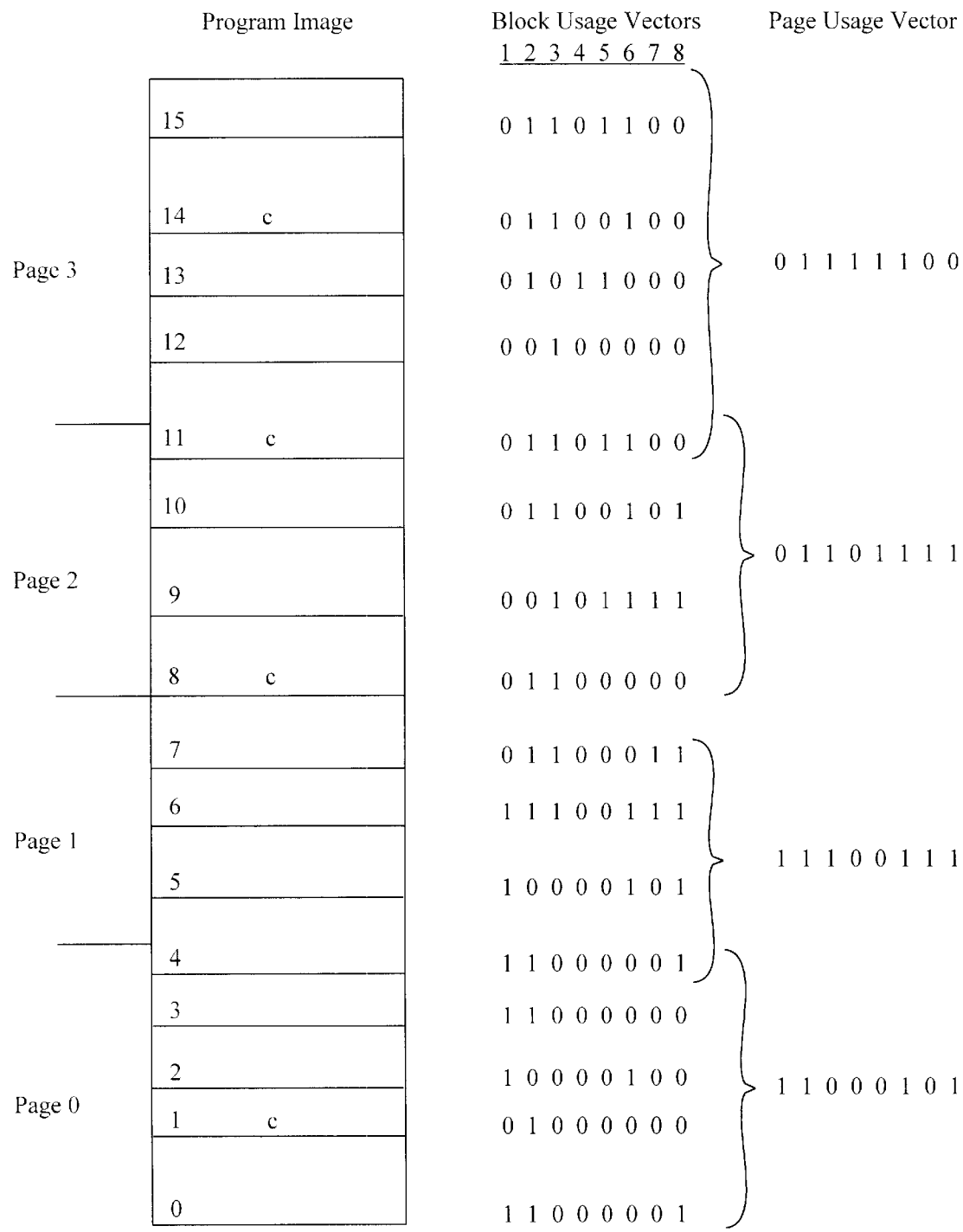
FIG. 3 is a diagram of a sample source program image.

FIG. 3 is a diagram of a sample source program image. The sample program image 301 contains 16 blocks that span four pages. Each block that contains the letter "c" has an alignment constraint. To the right of each block is a usage vector for that block. In this example, the usage vectors represent the usage of the blocks during 8 time intervals, and thus each usage vector has 8 bits, one for each timed interval. The usage vector for block 0 is "11000001," which means that block 0 was used during time intervals 1, 2, and 8, but not during time intervals 3, 4, 5, 6, and 7. To the right of the block usage vectors is a page usage vector for each page. A page usage vector indicates the time intervals during which the page is used. The usage vector for page 0 is "1000101," which means that page 0 was used during time intervals 1, 2, 6, and 8, but not during time intervals 3, 4, 5, and 7. A page is used during a time interval if at least one block that is on that page is used during the time interval. Thus, a page usage vector can be derived bitwise logically ORing the usage vectors of the blocks on that page.

To create the destination program image for the program image of FIG. 3, the alignment system first selects block 1, which is the first alignment constrained block and initializes a group to contain that block. The alignment system then identifies the blocks that can be grouped with the selected block. The alignment system first scans the contiguous blocks in either the forward or backward direction. For example, if the alignment system first scans in the forward direction (i.e., lower memory addresses), it would identify that block 0 could be rearranged with block 1 without affecting the temporal usage pattern of any page. In particular, if blocks 0 and 1 were rearranged, the usage vector of page 0 (and all other pages) would remain the same. Since block 0 is the first block, there is no other block in the forward direction. The alignment system then starts scanning blocks contiguous to block 1 in the backward direction (i.e., higher memory addresses). The alignment system would determine that blocks 2 and 3 could also be added to the group that would then contain blocks 0–3. When the alignment system checks block 4, it would determine that block 4 could also be added to the group. In particular, any of blocks 0–3 could be rearranged with block 4 without affecting the temporal usage pattern of pages 0 or 1. For example, if blocks 0, 1, 2, 3, and 4 were reordered as blocks 0, 1, 3, 4, and 2, then block 2 would be on page 1 and block 4 would be on page 0. However, since page 0 is already used each time interval that block 4 is also used and page 1 is already used each time interval that block 2 is used, then the temporal usage patterns of the pages are not affected. (As used in this description, "without affecting the temporal usage pattern of a page" means changing the temporal usage pattern so that a page is used during an additional time interval. It is possible, as in the case of page 0 in this rearranging of blocks 0–4, that a page may be incidentally used during a fewer number of intervals. With this rearranging, page 0 would not be used during time interval 6.) The alignment system would then determine that block 5 could also be added to the group that would then contain blocks 0–5. However, block 6 could not be added to the group. Since block 6 is used during time interval 7, if it was moved onto page 0, it would affect the temporal usage pattern of page 0. Thus, the alignment system would determine that the group contains blocks 0–5.

Which blocks and the number of blocks that are in group can be different based on the ordering in which the blocks are added to the group. For example, when determining which blocks are in a group that includes alignment constrained block 8, the alignment system may first scan the blocks in the forward direction. When scanning in the forward direction, block 7 would be added to the group that would then contain blocks 7 and 8. Block 6 would not be added because if it were rearranged to be on page 2, then page 2 would be used during time interval 1. The alignment system would then scan in the backward direction. However, block 9 cannot be added to that group because if block 9 were moved to page 1, then the temporal usage pattern of page 1 would be affected (i.e., page 1 would then be used during time interval 5). However, if the alignment system first scans the blocks in the backward direction, it would identify the group as blocks 8–10. Block 11 would not be added to the group because if block 10 were rearranged to be on page 3, then page 3 would be used during time interval 8. Since the second group has more blocks, it would be preferable to use this group when aligning the blocks. Consequently, in one embodiment, the alignment system identifies a group of blocks by first scanning in the forward direction and another group of blocks by first scanning in the backward direction. The alignment system then selects the group with the most blocks to rearrange.

In one embodiment, after the alignment system identifies a group, it checks whether the group contains any alignment constrained block that also crosses a page boundary. For example, the group of blocks 11–12 contains block 11, which is a cross-page, constrained block. Block 13 cannot be added to this group because if block 13 were moved to page 2, then the temporal usage pattern of page 2 would be affected (i.e., page 2 would be used during time interval 4). However, if the blocks in the group were reordered within the source program image, then the number of blocks in the group could be increased. For example, if the order of blocks 11–12 were changed to 12 and 11, then block 11 would be entirely on page 3 and a new group could be identified that included blocks 11, 13, 14, and 15. As discussed below in more detail, the moving of cross-page, constrained blocks in the source program image will tend to increase the number of blocks in a group.

Figure 4A:
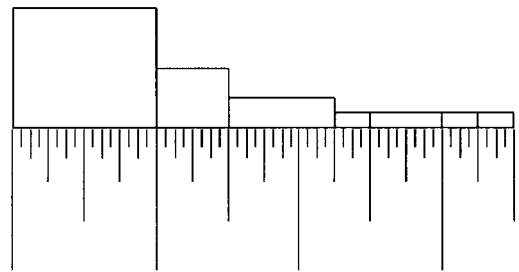
FIGS. 4A and 4B illustrate the storing of a group that contains only polite blocks.
Figure 4B:
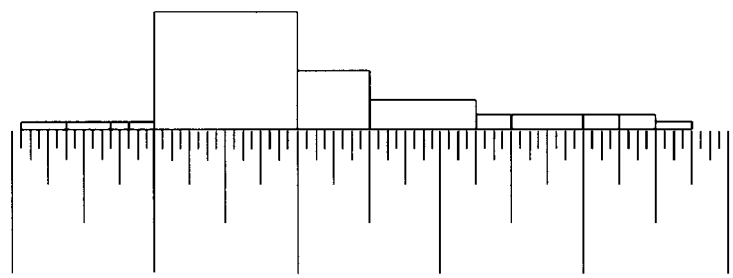

After a group is identified, the alignment system aligns the block in the group and stores the blocks of the group in the destination program image. If a group only has polite blocks, then satisfying the alignment constraints is relatively straightforward. The alignment system could satisfy the alignment constraints with minimal padding, by first storing blocks or padding to ensure that the next address in the destination program image is an integral multiple of the largest alignment constraint. The alignment system then stores the blocks with the largest alignment constraint, and stores each other block in the decreasing order of alignment constraint. FIGS. 4A and 4B illustrate the storing of a group that contains only polite blocks.

Figure 2A:
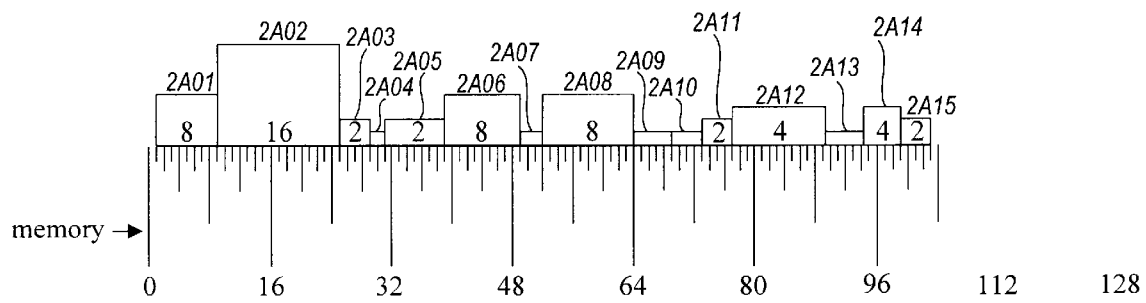
FIGS. 2A and 2B illustrate a typical technique for ensuring that the alignment constraints of a program image are satisfied.
Figure 2B:
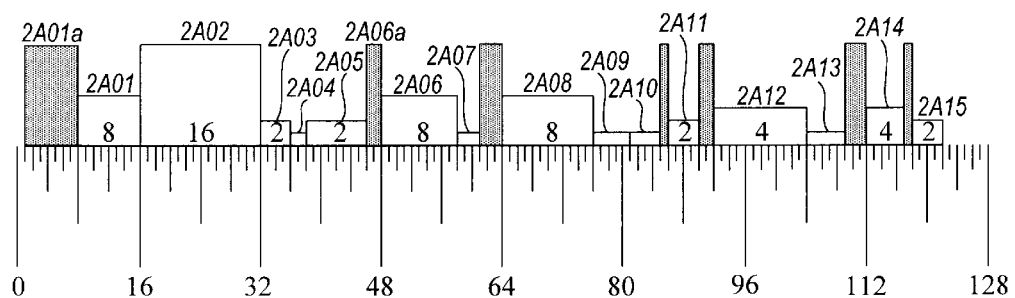
Figure 5:
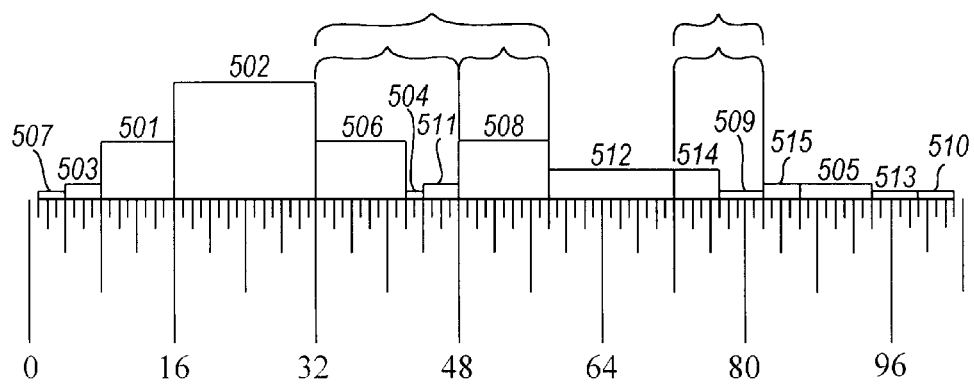
FIG. 5 illustrates the placement of the blocks in the group corresponding to FIG. 2A.

However, because each rude block is not an integral multiple of its alignment constraint, the next address, after a rude block is stored, may not be the proper alignment for the next block that is to be stored. To ensure proper alignment after storing a rude block, the alignment system creates a clusterette for each rude block. A clusterette contains the rude block, along with other blocks and padding, that will cause the size of the clusterette to be an integral multiple of the alignment of the block to be stored after the clusterette. Thus, the arrangement of the polite blocks and the clusterettes can occur by storing the polite blocks and clusterettes in decreasing order of alignment constraint. FIG. 5 illustrates the placement of the blocks in the group corresponding to FIG. 2A. Since the destination program image starts at address 1, the alignment system stores sufficient blocks (and padding, if necessary) at the beginning of the destination page image so that the next address will be an integral multiple of the largest alignment constraint. In this case, the alignment system needs to add either blocks or padding, with a total size of 15. Since blocks 2A07, 2A03, and 2A01 have a cumulative size of 15 and can be stored starting at address 1 with their alignment constraints satisfied, the alignment system stores these blocks starting at address 1. Next, the alignment system determines the largest alignment constraint of a block that has not yet been stored in the destination program image. In this example, block 2A02 has an alignment constraint of 16. The alignment system then stores block 2A02, starting at the next address, 16. The alignment system then identifies the largest alignment constraint of a block not yet stored in the destination program image. In this case, blocks 2A06 and 2A08 are rude blocks that both have alignment constraints of 8. The alignment system then stores block 2A06 starting at address 32. However, since block 2A06 is a rude block, the next address is not the proper alignment for block 2A08. Therefore, the alignment system selects blocks not yet stored in the destination program image along with padding, as appropriate, so that the next address will be an integral multiple of 8. In the example shown, the alignment system selects blocks 2A04 and 2A11, and stores them in the destination program image starting at address 42. The alignment system then stores block 2A08 starting at address 48. The alignment system then determines the largest alignment constraint of a block that has not been stored in the destination program image. In this example, blocks 2A12 and 2A14, both have alignment constraints of 4. Since the next address, 60, is an integral multiple of 4, the alignment is proper for these blocks. The alignment system in one embodiment, for reasons discussed below, stores the polite blocks before storing the rude blocks with the same alignment constraint. Therefore, the alignment system stores block 2A12 starting at address 60. The alignment system then stores block 2A14 starting at address 72. The alignment system then determines the largest alignment constraint of a block not yet stored in the destination program image. In this case, blocks 2A15 and 2A05. Both have alignment constraints of 2. However, since block 2A14 is a rude block, the next address does not necessarily satisfy the proper alignment constraint. Therefore, the alignment system selects blocks not yet stored in the destination program image and padding, as appropriate, so that the alignment constraint of 2 can be satisfied. In this case, the alignment system selects block 2A09 and stores it starting at address 77. The alignment system then stores blocks 2A15, 2A05, 2A13, and 2A10. As shown in this example, no additional padding was needed to satisfy the alignment constraints of all the blocks in the group.

Figure 6:
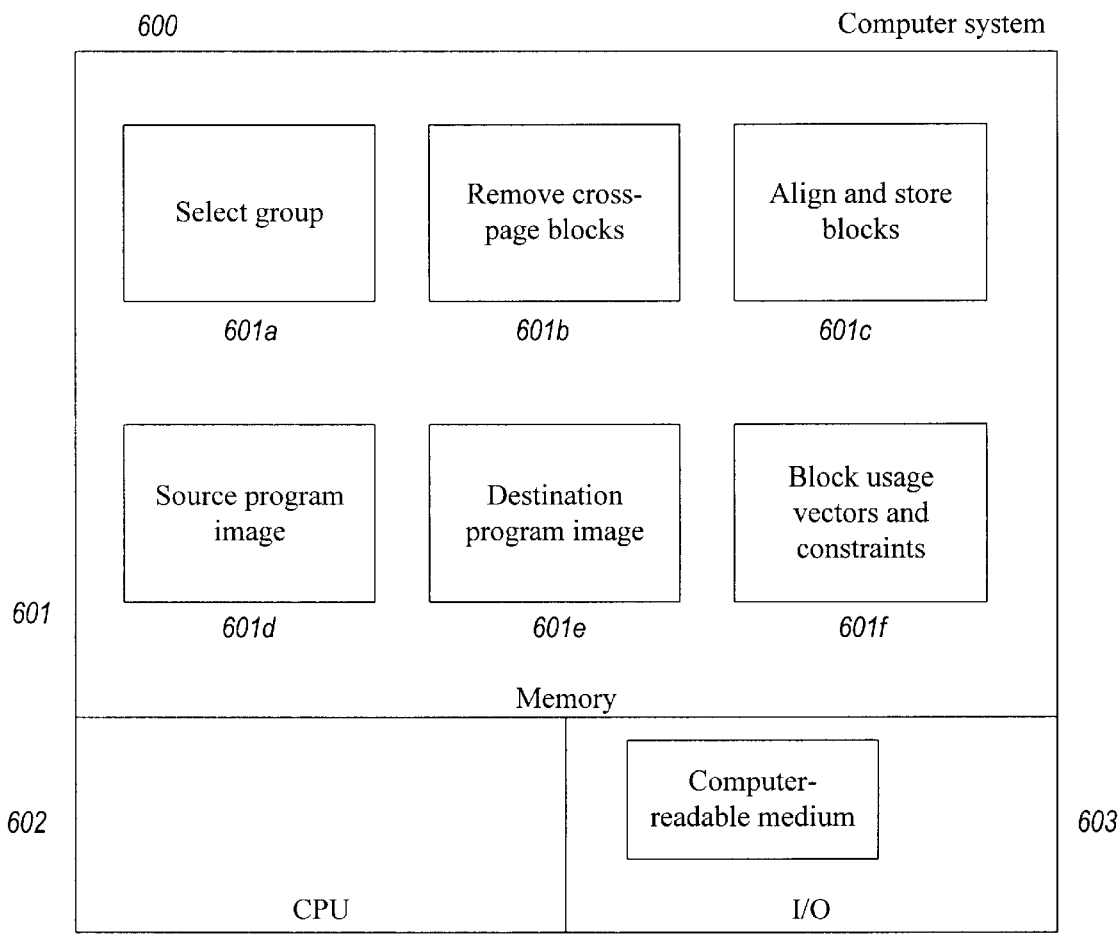
FIG. 6 is a block diagram of a computer system for executing an embodiment of the alignment system.

FIG. 6 is a block diagram of a computer system for executing an embodiment of the alignment system. The computer system 600 contains a memory 601, central processing unit 602, and input/output interface 603. The input/output interface interfaces with computer-readable media devices, such as a CD-ROM drive, which may be used to read the modules of the alignment system recorded on a computer-readable medium, such as a CD-ROM. The memory contains an implementation of the alignment system that includes a select group module 601a, a remove cross-page, constrained block module 601b, and an align and store blocks module 601c. The alignment system inputs the source programs image 601*d* and the block usage vectors and alignment constraints 601*f*. The alignment system invokes the select group module to identify the next group of blocks within the source program image based on the block usage vectors. If the group has any cross-page, constrained blocks, the alignment system invokes the remove cross-page, constrained block module to reorder the blocks of the group within the source program image so that no blocks within the group with an alignment constraint cross a page boundary. The alignment system then invokes the align and store blocks module to store the block of the group in the destination program image 601*e* with the alignment constraints satisfied. Although the alignment system is shown in memory, it may be stored more permanently on other computer-readable storage media, such as a disk.

Figure 7:
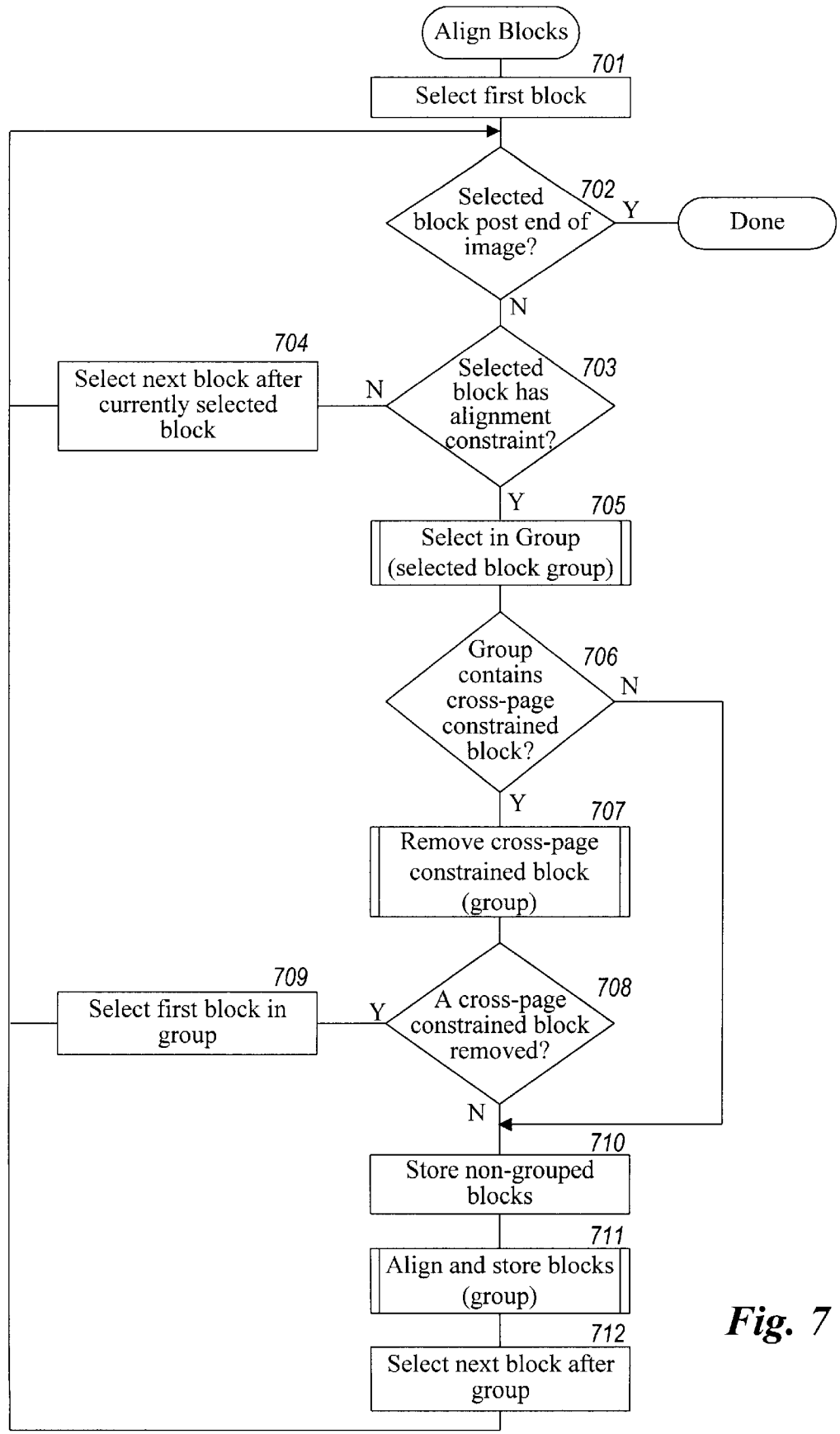
FIG. 7 is a flow diagram of an implementation of the alignment system.

FIG. 7 is a flow diagram of an implementation of the alignment system. The system aligns the blocks within a program image to satisfy their alignment constraints by rearranging the blocks in such a way that reduces the amount of padding that is needed and reduces the affect on the temporal usage patterns of the pages. The system receives a source program image along with the alignment constraints of the blocks, the temporal usage patterns of each block, and the page boundaries. The system also receives the starting addresses at which to store the aligned blocks. This system loops selecting each block in the source program image starting with the first. When the system selects a block with an alignment constraint, the system identifies the blocks that are in the same group. If an identified block with an alignment crosses a page boundary, the system attempts to reorder the blocks in the group so that no block with an alignment constraint crosses a page boundary. If the system is successful in the attempt, then the system re-identifies the blocks in the group. If the system is not successful or if the group contains no such cross-page, constrained blocks, then the system aligns the blocks in the group and stores them in the destination program image. In step 701, the system selects the first block in the source program image. In steps 702–704, the system loops searching for the next block with an alignment constraint. In step 702, if the selected block is past the end of the source program image, then the system is done, else the system continues at step 703. In step 703, if the selected block has an alignment constraint, then the system continues at step 705, else the system continues at step 704. In step 704, the system selects the next block after the currently selected block and loops to step 702. In step 705, the system invokes the select group routine passing the selected block and receiving in return a group of blocks that can be rearranged without affecting the temporal usage pattern of a page. In step 706, if the group of blocks contains an alignment constraint block that crosses a page boundary, then the system continues at step 707, else the system continues at step 710. In step 707, the system invokes the remove cross-page constrained block routine passing the group. If it can, that routine reorders the blocks of the group within the source program image so that no alignment constrained block crosses a page boundary. In step 708, if a cross-page, constrained block was moved, then the system continues at step 709, else the system continues at step 710. In step 709, the system selects the first block in the group and loops to step 702 to select a new group. In step 710, the system stores in the destination program image those blocks that are before the group and not already in the destination program image. Such blocks have no alignment constraint, but have a temporal usage pattern that does not allow them to be in the group. In step 711, the system invokes the align and store blocks routine passing the group. In step 712, the system selects the next block after the last block in the group and loops to step 702.

Figure 8:
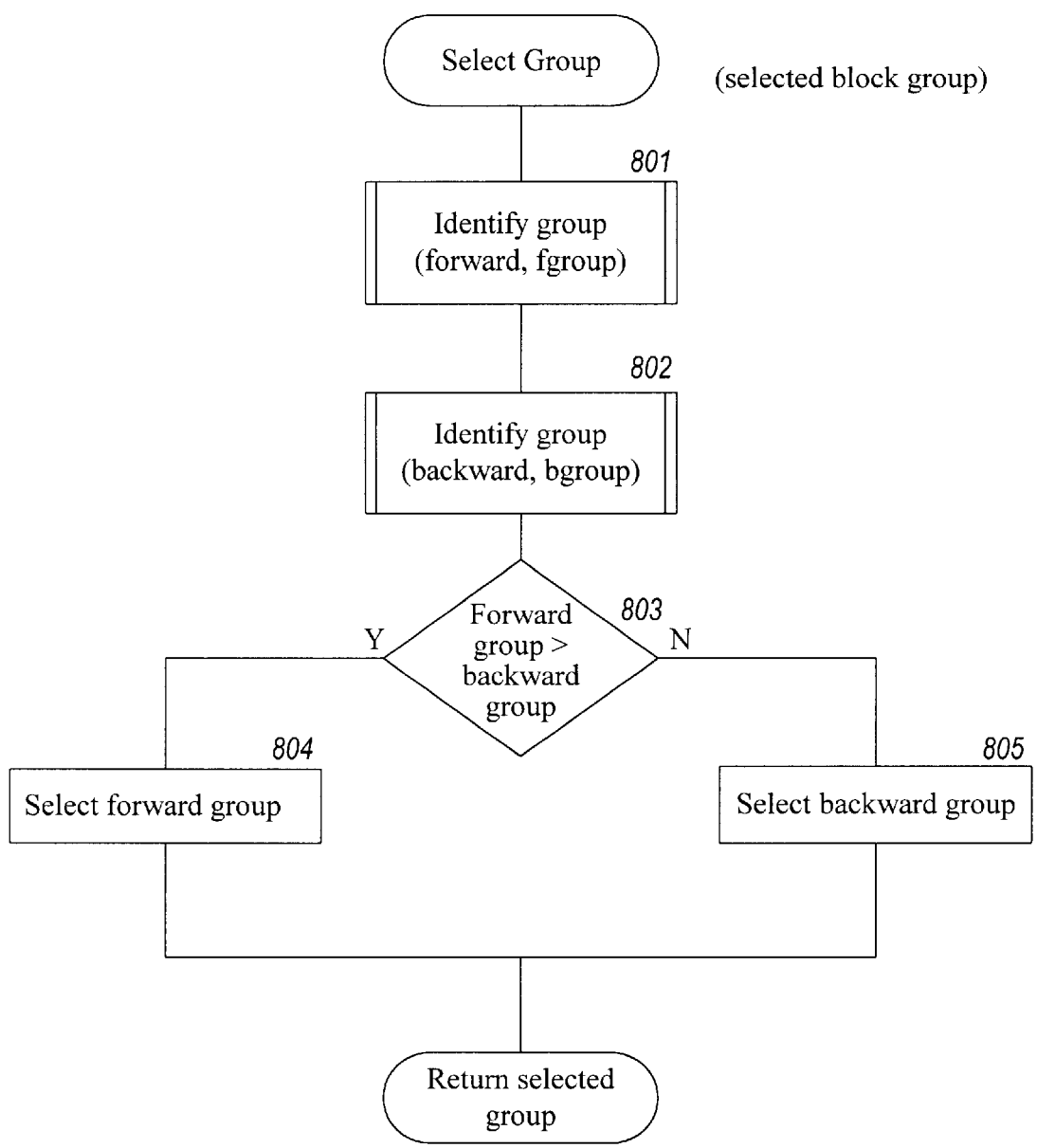
FIG. 8 is a flow diagram of an implementation of the select group routine.

FIG. 8 is a flow diagram of an implementation of the select group routine. This routine receives an indication of a selected block and identifies blocks that are in the same group as the selected block. Whether a certain block is in the group may depend on the ordering in which the blocks are added to the group. For example, if the selected block is the first block on a page, then it may be that the last block of the prior page can be added to a group with the selected block. However, perhaps the second-to-the-last block on the prior page cannot be added to the group. Moreover, it may be that the second block on the page cannot be in the same group as the last block of the prior page. Consequently, a group comprising the first block of the page and the last block of the previous page can be identified. Conversely, a group comprising each block on the same page of the select block can be identified. In general, many different groups of blocks that are contiguous with the selected block can be identified. In one embodiment, the routine identifies two groups of blocks. The routine identifies the first group by searching forward from the selected block and adding each block to the group that can be added and then searching backward from the selected block and adding each block to the group that can be added. The routine identifies the second group in a similar way except for reversing the order of the searching. The routine then selects the identified group with the most blocks to return. In step 801, the routine invokes the identify group routine passing an indication of the forward direction and receiving an identification of a group identified by searching in the forward direction first. In step 802, the routine invokes the identify group routine passing an indication of the backward direction and receiving an identification of a group identified by searching in the backward direction first. In step 803, if the forward group has a larger number of blocks than the backward group, then the routine continues at step 804, else the routine continues at step 805. In step 804 the routine selects the forward group and returns. In step 805, the routine selects the backward group and returns.

Figure 9:
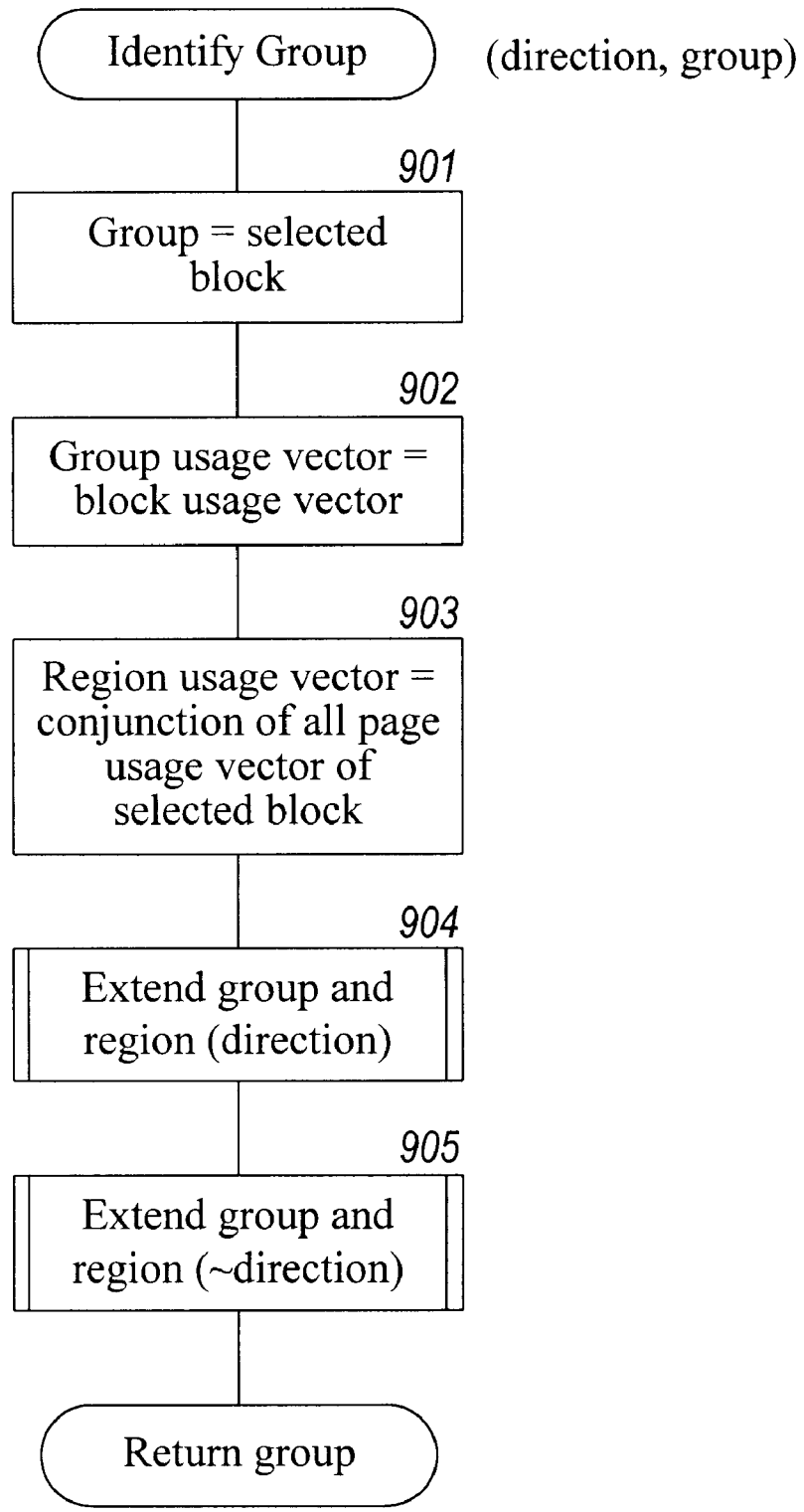
FIG. 9 is a flow diagram of an implementation of the identify group routine.

FIG. 9 is a flow diagram of an implementation of the identify group routine. This routine is passed a selected block and a direction. The routine identifies a group by first searching in the passed direction and then searching in the other direction. The routine returns an indication of the blocks in the group. A contiguous block is added to the group if when that block is added to the group, all the blocks in the group can still be rearranged in any order without affecting the temporal usage pattern of any page. The only pages that could be affected are those pages that contain at least a portion of a block that is in a group. These pages are referred to as a "region" of the group. A block can only be added to a group when it is only used in time intervals for which each page in the region is also used. Thus, if the block were moved to any page in the region, it would not affect the temporal usage pattern of that page. The routine tracks the temporal usage pattern of the region by setting each bit of a region usage vector to 1 only when each page of the region is used during the time interval represented by the bit. When a new page is added to a region, the routine updates the region usage vector by bitwise logically ANDing the region usage vector with the page usage vector of the new page. The routine also tracks the time intervals in which at least one block in the group is used. The routine tracks this group usage pattern by setting each bit of a group usage vector to 1 only when at least one block in the group is used during the time interval represented by the bit. When a new block is added to a group, the routine updates the group usage vector by bitwise logically ORing the group usage vector with the block usage vector of the new block. A set of blocks is a valid group when for every time interval in which a block is used, each page in the region is also used in that time interval. The routine calculates whether a new block can be added to a group by calculating a new group usage vector and a new region usage vector for the group with the new block added. The routine then performs a bitwise logical ANDing of the new group usage vector with the bitwise complement of the new region usage vector. If the result has each bit set to 0, then the new block can be added to the group. In step 901, the routine sets the group to contain the selected block. In step 902, the routine sets the group usage vector equal to the block usage vector for the selected block. In step 903, the routine sets the region usage vector to the conjunction of all page usage vectors of pages that contain a portion of the selected block. In step 904, the routine invokes the extend group and region routine passing the direction. In step 905, the routine invokes the extend group and region routine passing the reverse direction. The routine then returns the group that has been extended.

Figure 10:
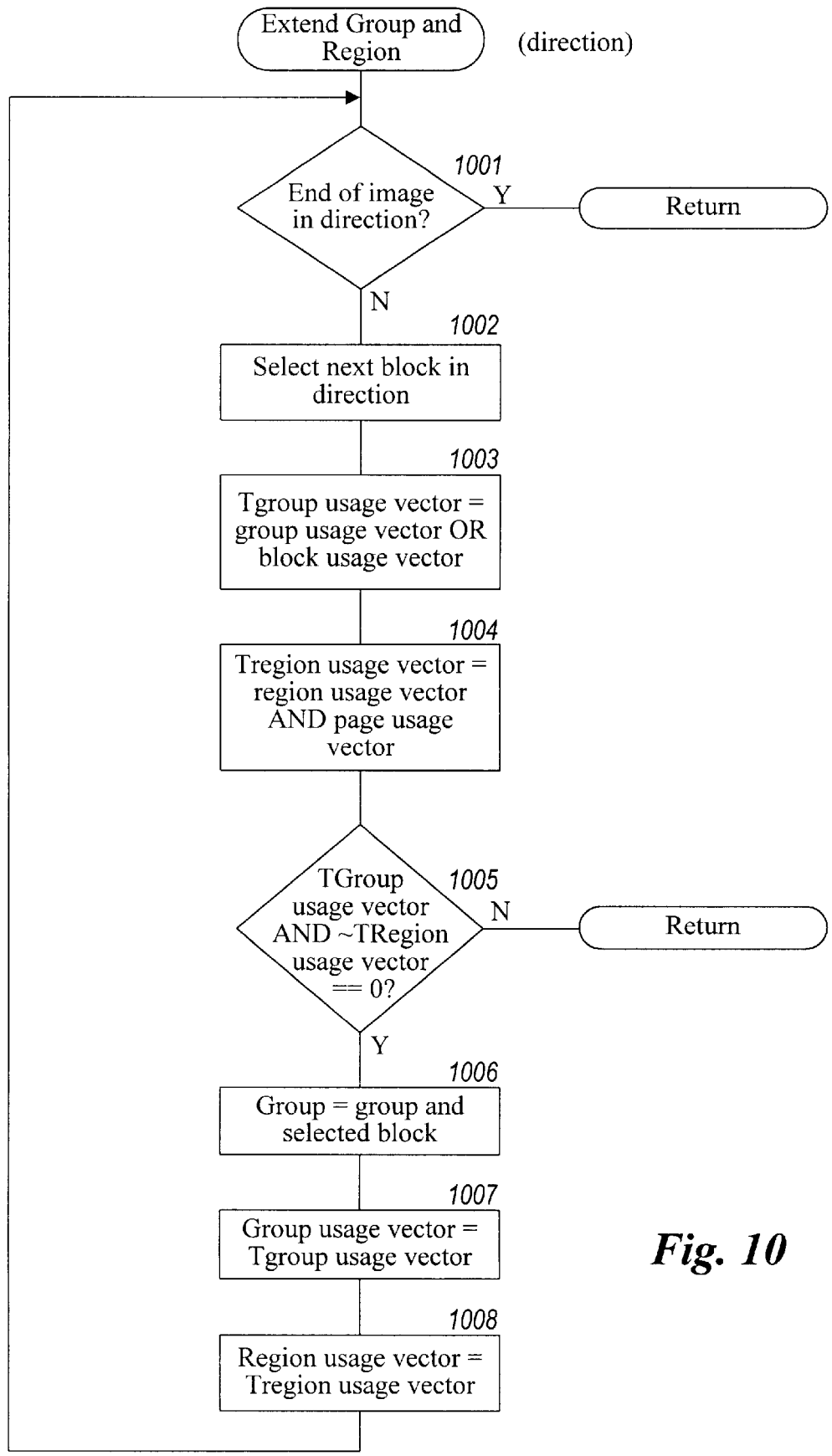
FIG. 10 is a flow diagram of an implementation of the extend group and region routine.

FIG. 10 is a flow diagram of an implementation of the extend group and region routine. This routine is passed a group and a direction. The routine searches the blocks in the passed direction for additional blocks that can be added to the group. The routine returns the group extended to include these additional blocks, if any. In step 1001, if the selected block is at the end of the source program image in the passed direction, then the routine returns, else the routine continues at step 1002. In step 1002, the routine selects the next block in the passed direction. In step 1003, the routine sets a temporary group usage vector equal to the group usage vector bitwise logically ORed with the block usage vector of the selected block. In step 1004, the routine sets a temporary region usage vector equal to the region usage vector bitwise logically ANDed with the page usage vector associated with the boundary of the selected block which is not adjacent to the group. In step 1005, if each bit of the result of the temporary group usage vector being bitwise logically ANDed with the complement of the temporary region usage vector is 0, then the routine continues at step 1006, else the routine returns because no more blocks can be added to the group in this direction. In step 1006, the routine adds the selected block to the group. In step 1007 the routine sets the group usage vector to the temporary group usage vector. In step 1008, the routine sets the region usage vector to the temporary region usage vector and loops to step 1001 to select the next block in the passed direction.

Figure 11:
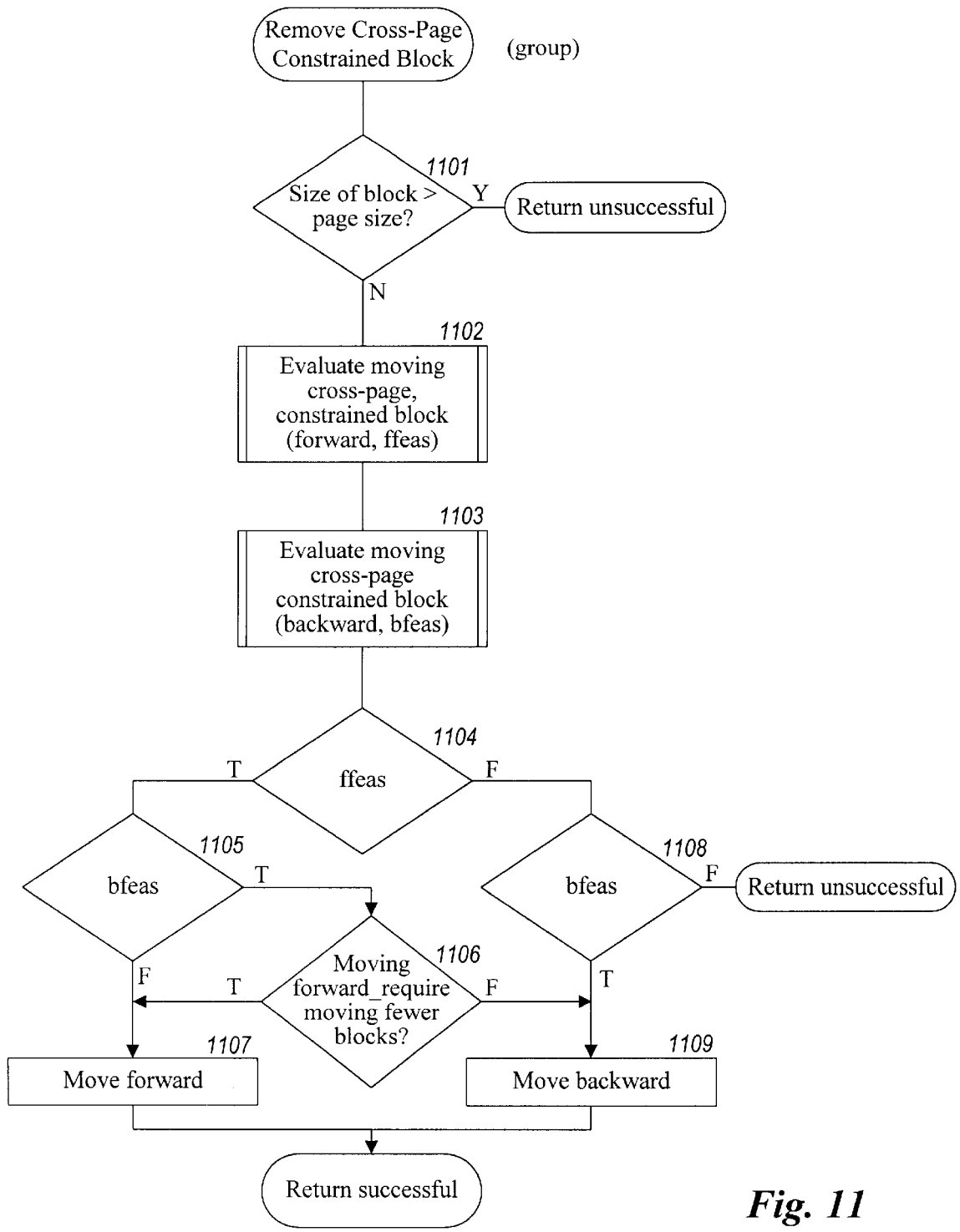
FIG. 11 is a flow diagram of an implementation of the remove cross-page, constrained block routine.

FIG. 11 is a flow diagram of an implementation of the remove cross-page, constrained block routine. The routine is passed a group that contains a block that is alignment constrained and that crosses a page boundary. The routine attempts to move the cross-page, constrained block in the forward direction or the backward direction so that the block no longer crosses a page boundary. If the cross-page block can be moved in either the forward or backward direction so that it no longer crosses a page boundary, then the routine selects the direction that requires moving the fewest number of blocks. The direction with the fewest number of blocks is selected on the assumption that since the source program image ordering has been already optimized by the page optimizer, moving fewer blocks will result in less disruption of that optimized ordering. This routine can be repeated for each cross-page, constrained block in the group. In step 1101, if the size of the cross-page, constrained block is greater than the size of a page, then the block will always cross a page boundary and the routine returns an indication that it was unsuccessful, else the routine continues at step 1102. In step 1102, the routine invokes the evaluate moving cross-page, constrained block routine passing an indication of the forward direction and receiving an indication of whether it is feasible to move the cross-page, constrained block in the forward direction so that it no longer crosses a page boundary. In step 1103, the routine invokes the evaluate moving cross-page, constrained block routine passing an indication of the backward direction and receives an indication of whether it is feasible. In step 1104, if it is feasible to move the cross-page, constrained block in the forward direction, then the routine continues at step 1105, else the routine continues at step 1108. In step 1105 if it is feasible to move the cross-page, constrained block in the backward direction, then the routine continues at step 1106, else the routine continues at step 1107. In step 1106, since it is feasible to move the cross-page, constrained block in either the forward or backward direction, if moving in the forward direction would require moving fewer blocks than moving in the backward direction, then the routine moves the cross-page, constrained block in the forward direction by continuing at step 1107, else the routine moves the cross-page, constrained block in the backward direction by continuing in step 1109. In step 1107, the routine moves the cross-page, constrained block in the forward direction and returns an indication that it was successful. In step 1108, if it is feasible to move the cross-page, constrained block in the backward direction, then the routine continues at step 1109, else it is not feasible to move the cross-page, constrained block in either direction and the routine returns an indication that it is unsuccessful. In step 1109, the routine moves the cross-page, constrained block in the backward direction and returns an indication that it was successful.

Figure 12:
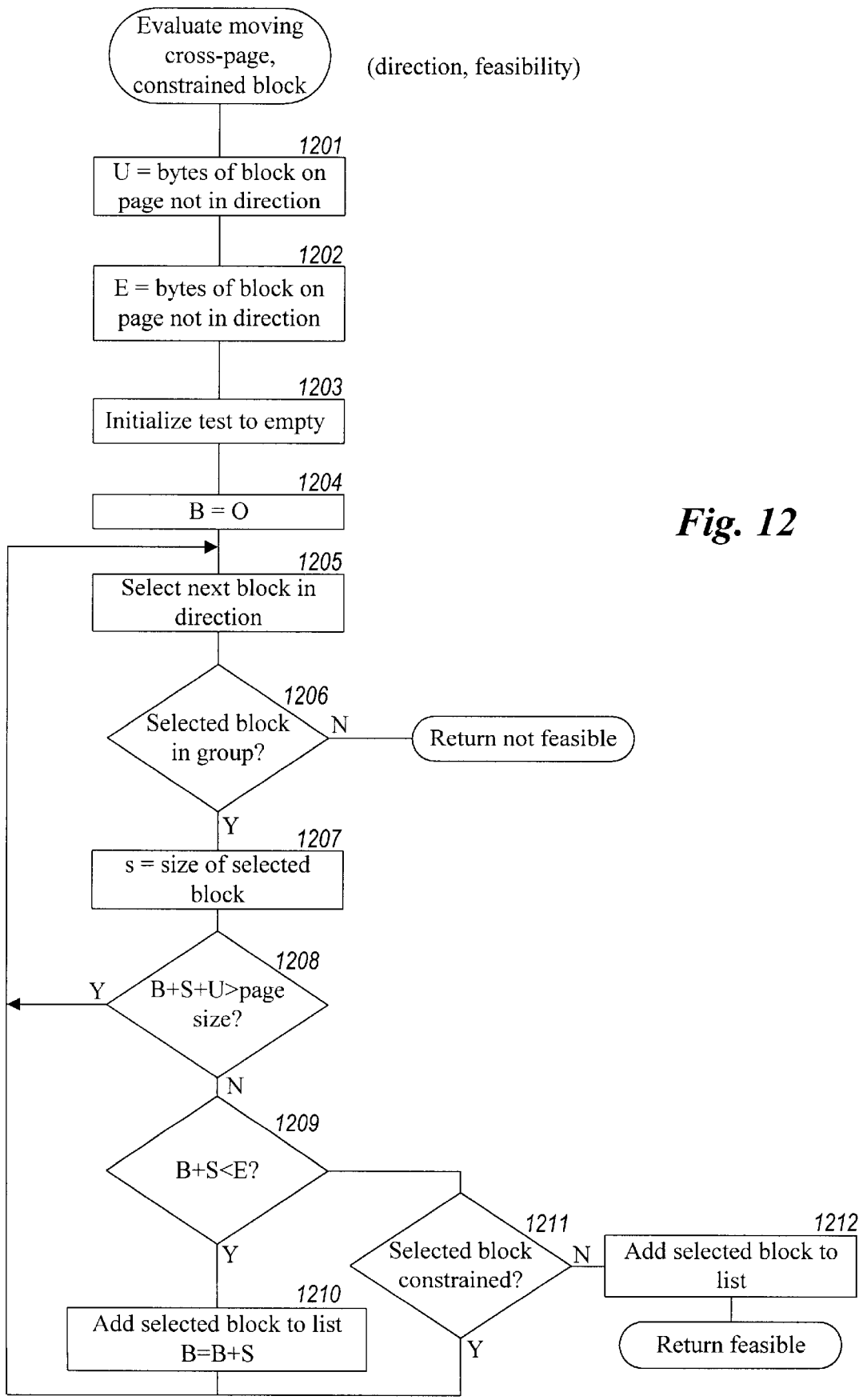
FIG. 12 is a flow diagram of an implementation of the evaluate moving cross-page, constrained block routine.

FIG. 12 is a flow diagram of an implementation of the evaluate moving cross-page, constrained block routine. The routine is passed an indication of a direction and returns an indication of whether it is feasible to move the cross-page, constrained block in that direction so that the block no longer crosses a page boundary. When evaluating whether the block can be moved, the routine determines the amount of the block that is on the page in the other direction. The routine tries to identify a number of blocks in the group in the passed direction whose combined size is equal to or larger than that determined amount. The cross-page, constrained block can be moved in the passed direction and the identified blocks can be moved to the area vacated by the cross-page, constrained block. The routine includes two checks to ensure that an alignment constrained block is not moved so that it does cross a page boundary. First, if the size of the identified blocks plus the amount of the cross-page, constrained block that is on the page in the passed direction is greater than the page size, then it is possible that the cross-paged, constrained block would be moved so that it crosses another page boundary. Therefore, the routine ensures that the size of the identified blocks plus the amount of the cross-page, constrained block in the passed direction is not greater than the page size by skipping a block that would cause the sum to be greater than the page size. Second, if the last block identified is an alignment constrained block, it may not be possible to ensure that the identified blocks can be moved without having another alignment constrained block cross a page boundary. Consequently, the routine ensures that the last block identified is not an alignment constrained block. In step 1201, the routine sets the variable U to the number of bytes of the cross-page, constrained block on the page in the passed direction. In step 1202, the routine sets the variable E equal to the number of bytes of the cross-page, constrained block on the page in the other direction. In step 1203, the routine initializes the list of identified blocks to empty. In step 1204, the routine sets the variable B to zero. Variable B contains the size of the blocks in the list. In step 1205, the routine selects the next block in the passed direction, starting with the block adjacent to the cross-page, constrained block. In step 1206, if the selected block is in the group, then the routine continues at step 1207, else the routine returns with an indication of non-feasibility. In step 1207, the routine sets the variable S to the size of the selected block. In step 1208, if the sum of the variable B, the variable S, and the variable U is greater than the page size, then the routine loops to step 1205 to select the next block, else the routine continues at step 1209. In step 1209, if the sum of the variable B and the variable S is less than the variable E, then not enough blocks have been added to the list to move the cross-page, constrained block off the page boundary and the routine continues at step 1210, else the routine continues at step 1211. In step 1210, the routine adds the selected block to the list, increments the variable B by the variable S, and loops to step 1205 to select the next block. In step 1211, if the selected block is alignment constrained, then the routine loops to step 1205 to select the next block, else the routine continues at step 1212. In step 1212, the routine adds a selected block to the list and returns with an indication of feasibility.

Figure 13:
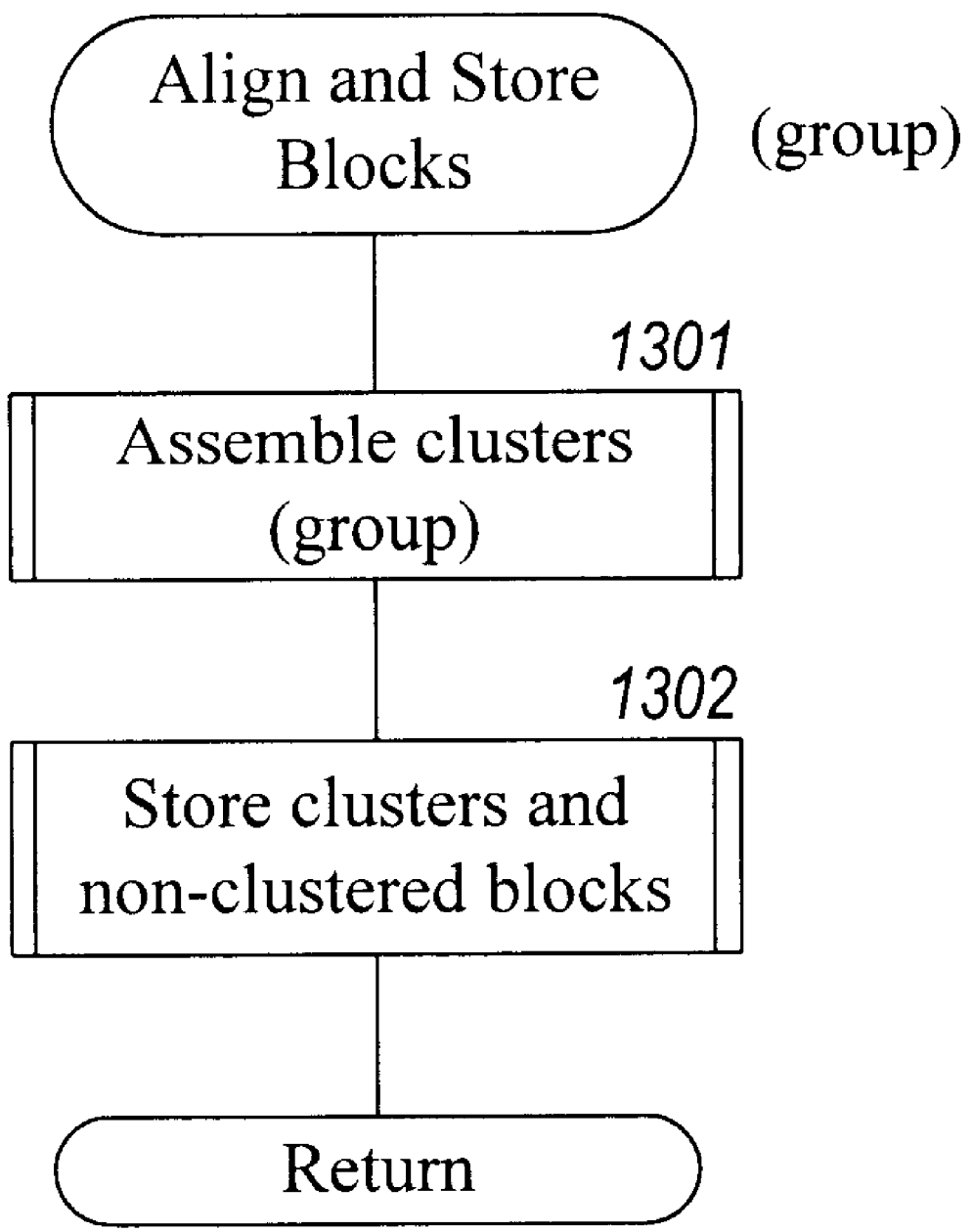
FIG. 13 is a flow diagram of an implementation of the align and store blocks routine.

FIG. 13 is a flow diagram of an implementation of the align and store blocks routine. This routine receives a group, ensures that all alignment constraints of the blocks within the group are satisfied, and stores the blocks in the destination program image. The routine proceeds in two phases. In the first phase, the routine selects each rude block in the group and identifies other blocks or padding to be stored immediately after the rude block. Each rude block and its identified blocks and padding are referred to collectively as a "clusterette." The clusterettes whose rude blocks have the same alignment constraints are referred to as a "cluster." Thus, the routine generates a cluster for each alignment constraint for which there is at least one rude block in the group. In the second phase, the routine stores the blocks and padding in each clusterette and the blocks that are not in a cluster in the destination program image. The routine stores the clusterettes and the non-clustered blocks by storing the non-clustered blocks and the clusterettes in descending alignment-constrained order starting with the largest alignment constraint and storing the non-clustered blocks for a given alignment constraint before storing the clusterettes with the same alignment constraint. In step 1301, the routine invokes the assemble cluster routine passing the group. In step 1302, the routine invokes the store clusters and non-clustered blocks routine. The routine then returns.

Figure 14:
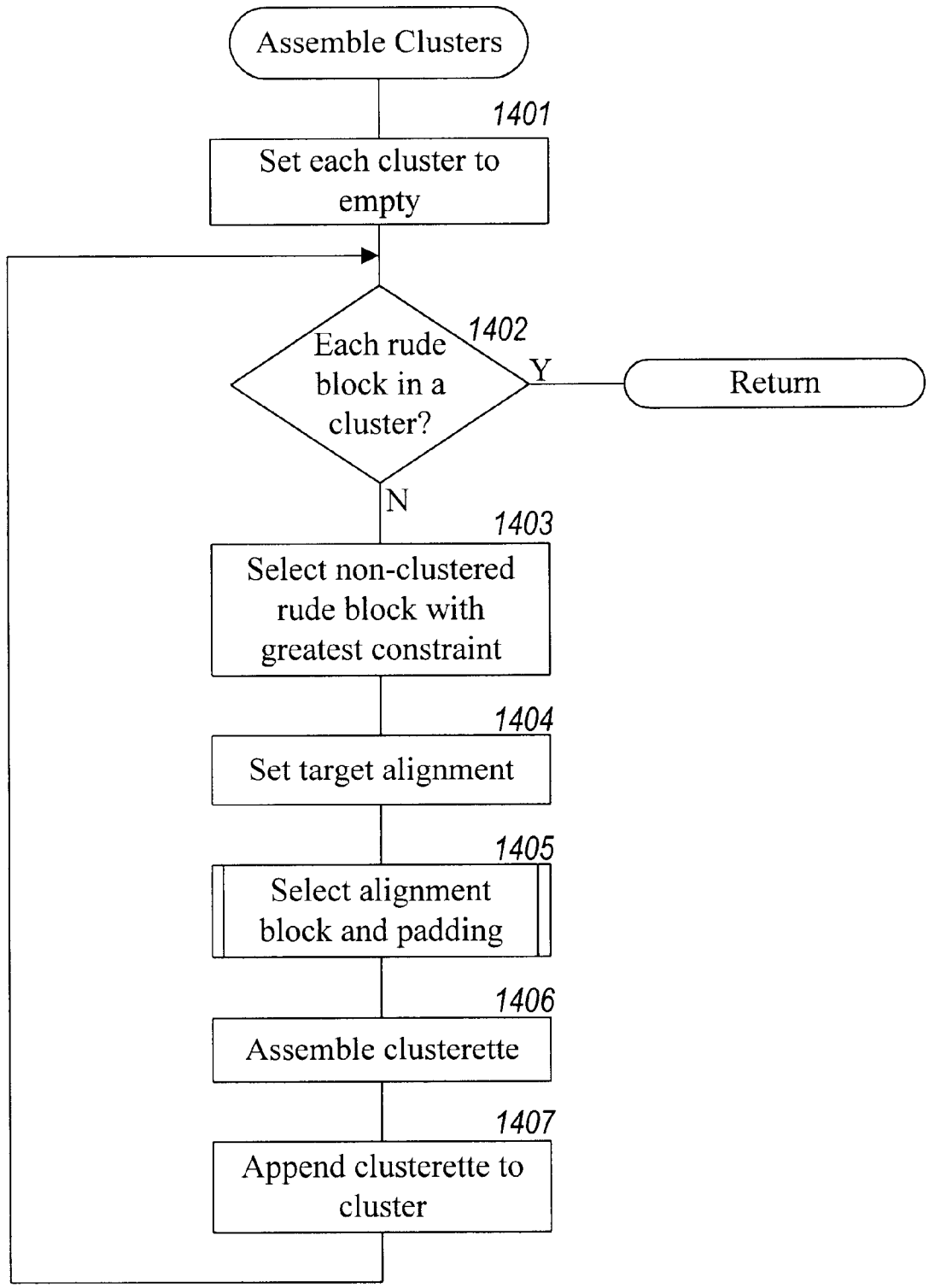
FIG. 14 is a flow diagram of an implementation of the assemble clusters routine.

FIG. 14 is a flow diagram of an implementation of the assemble clusters routine. The assemble clusters routine is passed a group and generates the clusterettes for each cluster in the group. In step 1401, the routine sets the cluster for each alignment constraint to empty. The routine maintains a cluster for each alignment constraint in the group and forms clusterettes and adds the clusterettes to the cluster. In step 1402, if each rude block is already in a cluster, then the routine returns, else the routine continues at step 1403. In step 1403, the routine selects a non-clustered rude block with the largest alignment constraint. In step 1404, the routine sets a target alignment equal to the maximum of the largest alignment constraint of a non-clustered rude block (other than the selected rude block) and of the largest alignment constraint of a non-clustered polite block that is less than the alignment constraint of the selected rude block. The target alignment indicates the alignment constraint of the next block that will be stored in the destination program image after the clusterette that contains the selected rude block. If there is another rude block with the same alignment constraint as the selected rude block, then the routine adds blocks and padding to the clusterette so that its size is an integral multiple of the alignment constraint. If, however, there is no other rude block with the same alignment constraint, then the routine adds blocks and padding to the clusterette so that it is an integral multiple of the alignment constraint of the next polite block or clusterette that will be stored in the destination program image. Thus, the routine ensures that each clusterette has blocks and padding so that the alignment constraint of the next block to be stored is satisfied. In step 1405, the routine invokes the select alignment block and padding routine to determine which blocks and padding should be added to the clusterette to satisfy the target alignment. In step 1406, the routine assembles a clusterette from the selected rude block, followed by padding, followed by the determined blocks in increasing order of their alignment constraints. In step 1407, the routine then appends the assembled clusterette to the appropriate cluster and loops to step 1402.

Figure 15:
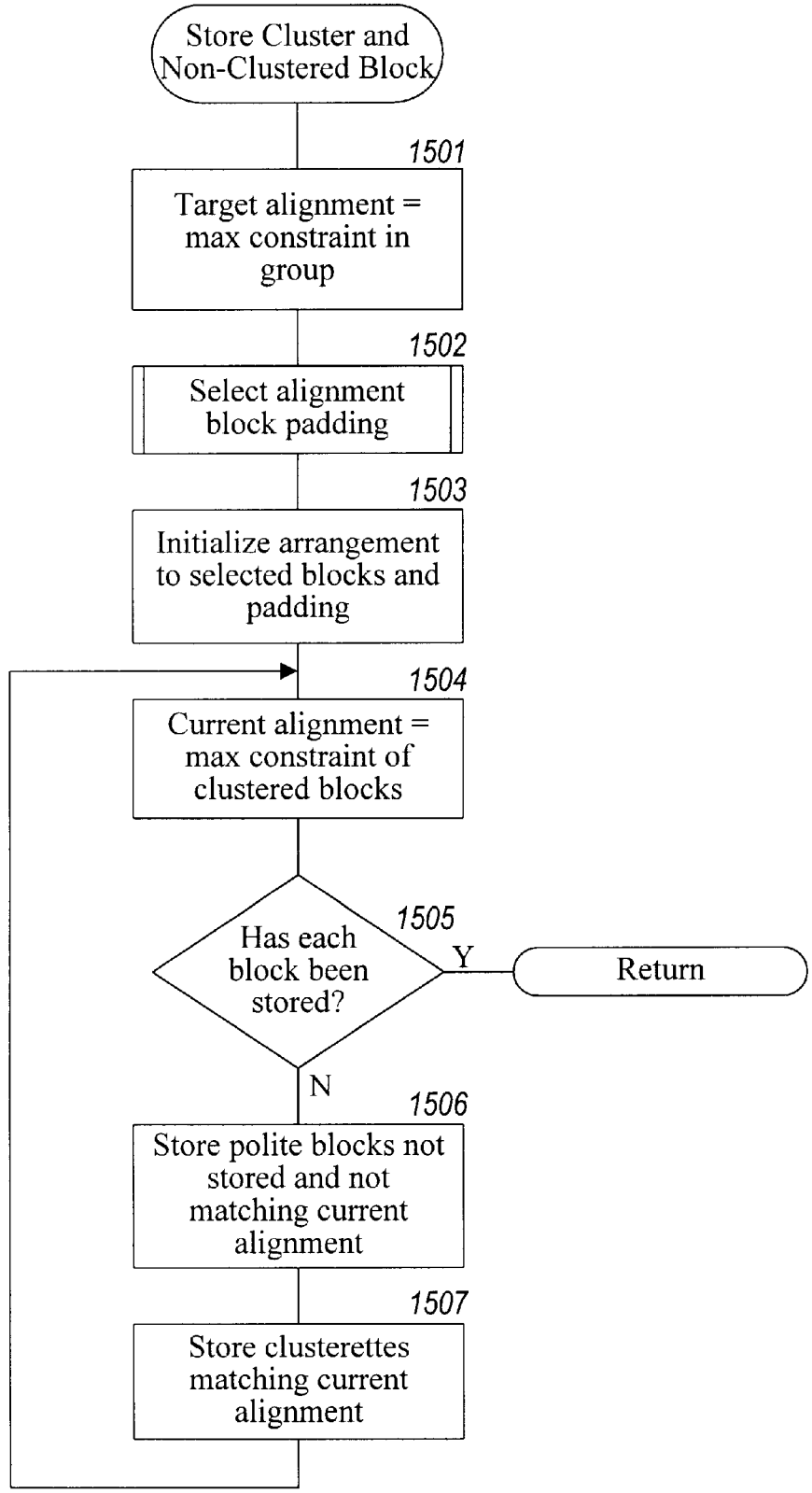
FIG. 15 is a flow diagram of an implementation of the store clusters and non-clustered blocks routine.

FIG. 15 is a flow diagram of an implementation of the store clusters and non-clustered blocks routine. In steps 1501–1503, the routine stores non-cluster blocks and padding at the start of the destination program image so that the next address is an integral multiple of the largest alignment constraint in the group. In step 1501, the routine sets the target alignment to the largest alignment constraint in the group. In step 1502, the routine invokes the select alignment and padding routine to determine the blocks and padding to satisfy the target alignment. In step 1503, the routine stores at the start of the destination program image the padding followed by the determined blocks in increasing order of their alignment constraints. In step 1504, the routine sets the current alignment equal to the largest alignment constraint of the blocks not yet stored in the destination program image. In step 1505, if each block has already been stored, then the routine retunis, else the routine continues at step 1506. In step 1506, the routine stores those polite blocks that are not already stored and that match the current alignment in the destination program image. In step 1507, the routine stores each clusterette that matches the current alignment in the destination program image and loops to step 1504. The clusterettes are stored in the destination program image in the same order that they were added to the cluster.

Figure 16A:
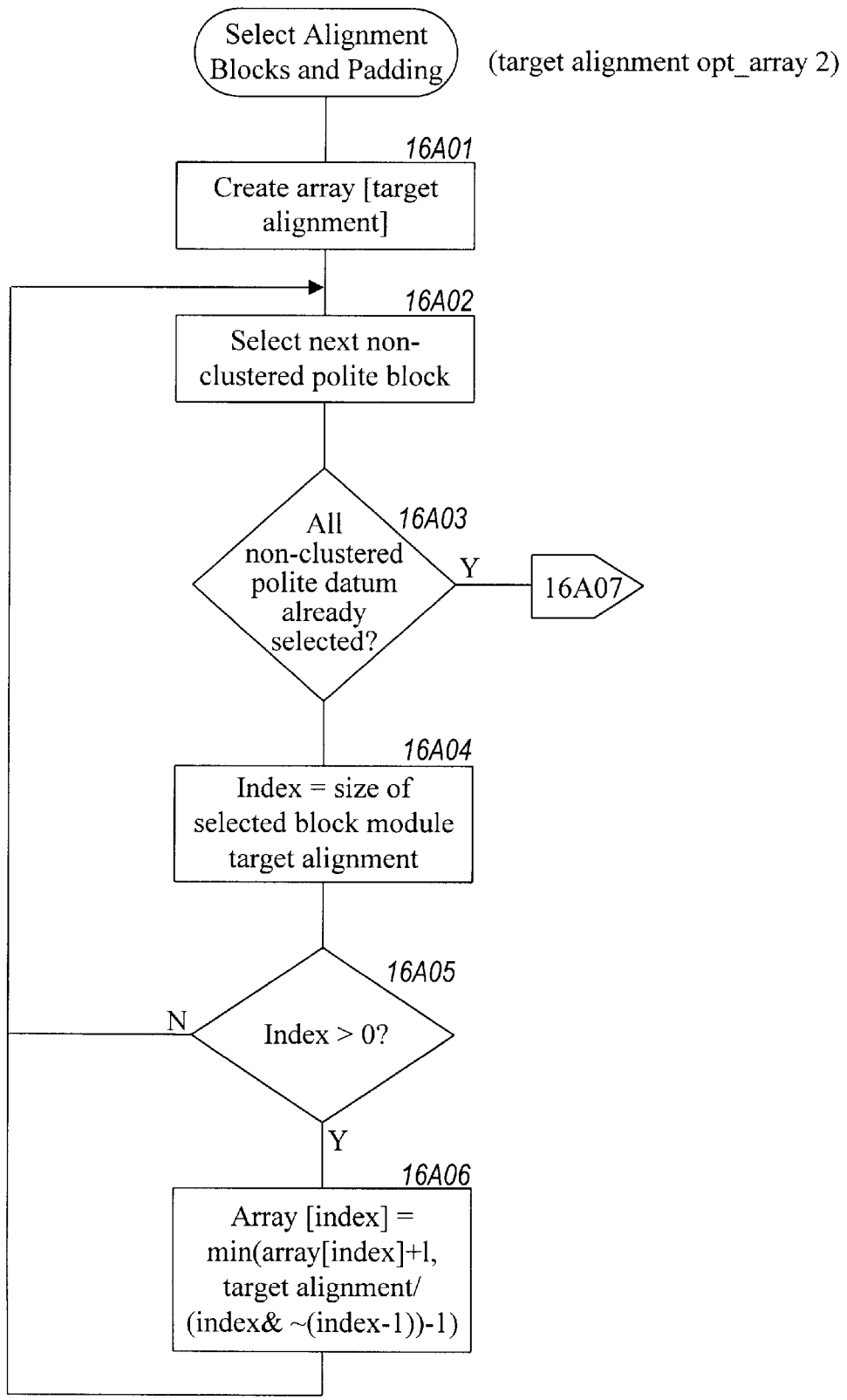
FIGS. 16A and 16B are a flow diagram of an implementation of the select alignment blocks and padding routine.
Figure 16B:
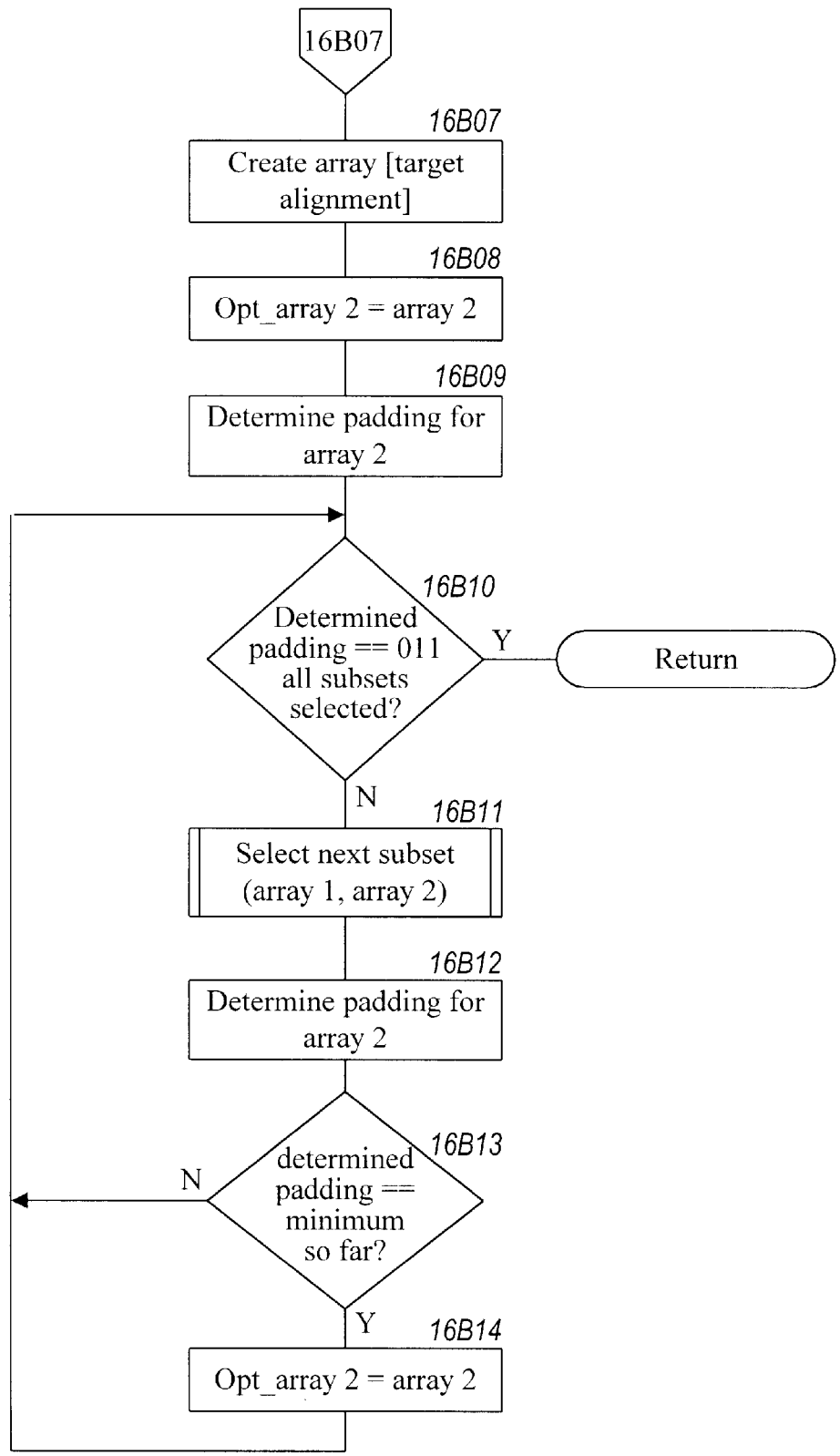

FIGS. 16A and 16B are a flow diagram of an implementation of the select alignment blocks and padding routine. The select alignment blocks and padding routine is passed a target alignment and a next address. The routine determines which non-clustered blocks and padding should be stored at the next address to satisfy the target alignment. The routine first determines the block sizes that are available to be added to satisfy the target alignment. Only polite blocks whose alignment constraints are less than the target alignment can be used to satisfy the target alignment. Also, for each block size modulo the target alignment, only a certain number of blocks could be used to satisfy the target alignment. For example, if the alignment constraint is 16, it would not be helpful to use more than 15 blocks whose size modulo 16 is 1. With these 15 blocks, the alignment constraint of 16 could be satisfied starting with any next address. For example, if the next address is 1, then these 15 blocks could be stored in the destination program image to satisfy the alignment constraint of 16. Similarly, it would not be helpful to use more than 7 blocks whose size modulo 16 is 2. With these 7 blocks and one block whose size modulo 16 is 1, the alignment constraint of 16 could be satisfied starting with any next address. If the next address is 1, then these 7 blocks plus one block whose size modulo 16 is 1 can be used to satisfy the target alignment of 16. This routine returns an optimal array with a number of elements equal to the target alignment. Each element of the optimal array is indexed by a block size modulo the target alignment. Each element contains the number of blocks of that size modulo that are to be used to meet the target alignment. If the optimal array will not satisfy the target alignment, then padding is needed. In step 1601, the routine creates a first array with a number of elements equal to the target alignment. In step 1602, the routine selects the next non-clustered polite block. In step 1603, if all the non-clustered polite blocks have already been selected, the routine continues at step 1607, else the routine continues at step 1604. In step 1604, the routine sets the index equal to the size of the selected block modulo the target alignment. In step 1605, if the index is greater than zero, then routine continues at step 1606, else the routine loops to step 1602 to select the next non-clustered polite block. In step 1606, the routine sets the indexed element of the first array to the minimum of the indexed element of the first array incremented by one and the target alignment divided by the index bitwise logically ANDed with the complement of the index minus one, less one (i.e., Array1[index]=min(Array1[index]+1, target_alignment/(index&≠(index−1))−1). This number is the maximum number of each block size modulo the target alignment that could be used to satisfy the target alignment. That number is limited by the number of polite blocks that have not yet been clustered. The routine then loops to step 1602. In step 1607, the routine creates a second array with a number of elements equal to the target alignment and initially each element set to 0. In step 1608, the routine sets an optimal array to equal to the second array. In step 1609, the routine determines the padding for the second array. In steps 1610–1614, the routine loops determining for each possible subset of polite blocks that are not clustered, which subset of blocks would result in the minimal padding needed to satisfy the target alignment. In step 1610, if the determined padding equals zero or all subsets have already been selected, then the routine returns, else the routine continues at step 1611. In step 1611, the routine invokes the select next subset routine passing the first array and second array. In step 1612, the routine determines the padding that would be required if the subset of blocks were selected according to the second array. In step 1613, if the determined padding is the minimum padding so far, then the routine continues at step 1614, else the routine loops to step 1610. In step 1614, the routine sets the optimal array equal to the second array and loops to step 1610.

Figure 17:
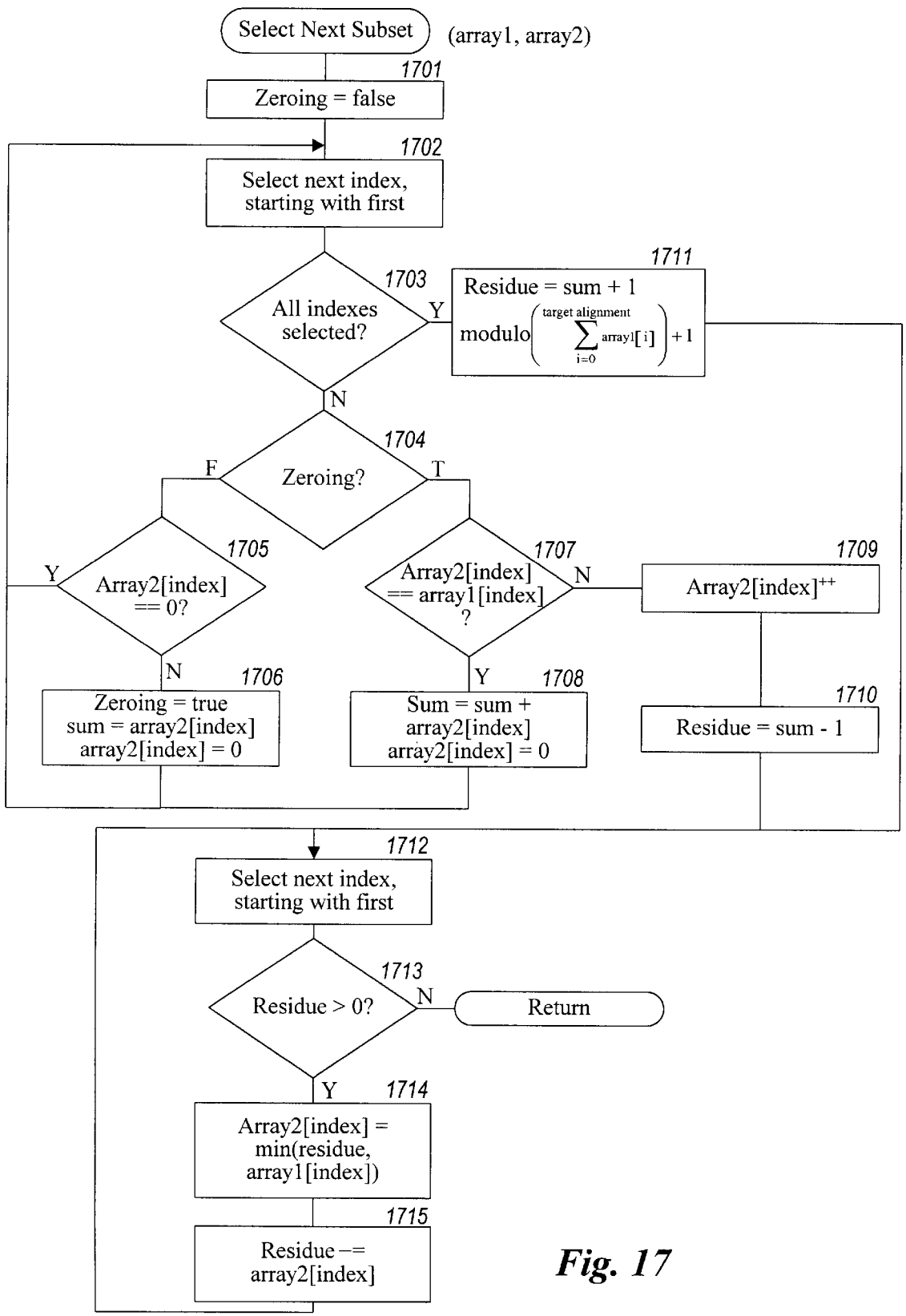
FIG. 17 is a flow diagram of an implementation of the select next subset routine.

FIG. 17 is a flow diagram of an implementation of the select next subset routine. This routine is passed the first array and the second array. The routine generates the next subset based on the current subset identified in the second array and the maximum possible number of blocks for each size modulo the target alignment indicated in the first array. The routine generates the subsets in increasing order of cardinality. That is, those subsets that have 1 element (i.e., cardinality=1) are generated before those subsets having 2 elements (i.e., cardinality=2), and so on. By generating the subsets in cardinality order, the alignment system selects the smallest number of blocks that would require no padding to meet a target alignment constraint without having to check every possible subset. One skilled in the art would appreciate that other algorithms to generate the subsets could be used even if they did not generate the subsets in order of increasing cardinality. FIG. 18 contains each subset of a sample array in the order (i.e., increasing cardinality) that they are generated. In this example, the first array contains the values 0, 3, 1, 3 and the second array initially contains 0, 0, 0, 0. This example has 32 (i.e., (0+1)*(3+1)*(1+1)*(3+1)) different subsets. Subsets 1802–1804 have a cardinality of 1, subsets 1805–1809 have a cardinality of 2, and so on. In this example, the subset 0, 1, 0, 3 (1821) with a cardinality of 4 is returned after the 21st call to this routine. In step 1701, the routine sets the Boolean flag zeroing to false. In step 1702, the routine selects the next index into the array starting with the first. In step 1703, if all the indexes have already been selected, then the routine continues at step 1711, else the routine continues at step 1704. In step 1704, if the zeroing flag equals false, then the routine continues at step 1705, else the routine continues at step 1707. In step 1705, if the indexed element of the second array is not equal to zero, then the routine continues at step 1706, else the routine loops to step 1702 to select the next index. In step 1706, the routine sets the zeroing flag to true, sets the sum equal to the value of the indexed element of the second array, and sets the indexed element of the second array to zero, and loops to step 1702 to select the next index. In step 1707, if the indexed element of the second array equals the indexed element of the first array, then the routine continues at step 1708, else the routine continues at step 1709. In step 1708 the routine increments the sum by the value of the indexed element of the second array and sets the index element of the second array to zero, and loops to step 1702 to select the next index. In step 1709, the routine increments the indexed element of the second array. In step 1710, the routine sets a residue variable to the sum minus one. In step 1711, the routine sets the residue to the sum plus one modulo the sum of the elements in the first array plus one. In step 1712, the routine selects the next index starting with the first. In step 1713, if the residue is not greater than zero, then the routine returns, else the routine continues at step 1714. In step 1714, the routine sets the indexed element of the second array equal to the minimum of the residue and the indexed element of the first array. In step 1715, the routine decrements the residue by the indexed element of the second array and loops to step 1712.

Although the present invention has been described in terms of an embodiment, it is not intended that the invention be limited to these embodiment. Modifications within the spirit of the invention will be apparent to those skilled in the art. The scope of the present invention is defined by the claims that follow.

We claim:

1. A method in a computer system for aligning blocks of a source program image in accordance with alignment constraints, the source program image being divided into pages, the method comprising:

for each of a plurality of time intervals corresponding to an execution of the source program image, receiving an indication of which of the blocks are accessed during that time interval;

for each page, determining from the received indications whether the page is accessed during each time interval;

identifying a block of the source program image that has an alignment constraint; and repeating the following until all blocks have been aligned,
identifying a group of contiguous blocks that are adjacent to the identified block such that the identified blocks can be rearranged without increasing the number of pages that are accessed during each time interval;

when the group of blocks has a certain block that has an alignment constraint and that crosses a page boundary, determining whether the blocks of the group can be reordered so that the certain block does not cross a page boundary; and when the blocks can be reordered, reordering the blocks of the group; and identifying the first block of the reordered group of block with an alignment constraint; and when the group of blocks does not have a certain block that has an alignment constraint and that crosses a page boundary or when the blocks cannot be reordered so that the certain block does not cross a page boundary, aligning the blocks in the group; and identifying the next block after the blocks of the group that has an alignment constraint.

2. The method of claim 1 including after aligning the blocks in the group, storing the blocks of the group in a destination program image.

3. The method of claim 1 wherein the aligning of the blocks in the group includes:

selecting a block of the group that has the largest alignment constraint of the blocks not yet stored in a destination program image;

when a next address of the destination program image is not an integral multiple of the alignment constraint of the selected block, choosing one or more blocks not yet stored in the destination program image and any padding necessary to make the next address an integral multiple of the alignment constraint of the selected block; and storing the chosen one or more blocks and necessary padding in the destination program image; and storing the selected block in the destination program image.

4. The method of claim 3 wherein the choosing of one or more blocks and necessary padding includes:

iteratively generating every possible subset of block sizes modulo the alignment constraint of the selected block that can be used to satisfy the alignment constraint of the selected block; and determining which subset would require the minimum amount of padding to satisfy the alignment constraint of the selected block.

5. The method of claim 1 wherein the identifying of a group of contiguous blocks that are adjacent to the identified block includes:

identifying a forward group of blocks by first searching in the forward direction and then in the backward direction;

identifying a backward group of blocks by first searching in the backward direction and then in the forward direction; and determining whether the forward or the backward group has more blocks.

6. The method of claim 1 wherein the step of determining whether the blocks of the group can be reordered so that the certain block does not cross a page boundary includes:

establishing a direction to search;

determining an amount of the certain block that is in the page opposite the established direction;

identifying blocks by searching in the established direction such the sum of the sizes of the identified blocks is greater than the determined amount; and moving the identified blocks and the certain block so that the certain block does not cross a page boundary.

7. The method of claim 6 wherein the identifying of blocks by searching in the established direction includes disregarding any block that when identified would result in the sum of the sizes of the identified blocks to be greater than a page size.

8. The method of claim 6 wherein the identifying of blocks by searching in the established direction includes disregarding any block with an alignment constraint that when identified would result in the sum of the sizes to be greater than the determined amount.

9. The method of claim 6 including identifying forward blocks by searching in the forward and identifying backward blocks by searching in the backward direction, determining whether the forward blocks or the backwards blocks contain fewer blocks, and reordering the determined identified blocks with the certain block.

10. A method in a computer system for aligning blocks of a program image in accordance with alignment constraints, the program image being divided in pages, the method comprising:

for each of a plurality of time intervals during an execution of the program image, receiving an indication of which of the block are accessed during that time interval, each page being accessed during each time interval in which a block that it contains is accessed;

identifying a first block that has an alignment constraint;

identifying a plurality of contiguous blocks that are adjacent to the identified first block such that the identified blocks can be rearranged such that a sum of a number of pages accessed during each time interval is not increased; and rearranging the identified blocks to satisfy any alignment constraints of the identified blocks.

11. The method of claim 10 wherein the identifying of a first block, the identifying of the plurality of contiguous blocks, and the rearranging of the identified blocks are repeated for blocks not yet rearranged until all blocks in the program image have their alignment constraints satisfied.

12. The method of claim 10 wherein when the identified blocks contain a certain block with an alignment constraint that crosses a page boundary, reordering the identified blocks so that the certain block no longer crosses a page boundary and repeating the identifying of a first block and of the plurality of contiguous blocks with the reordered blocks.

13. The method of claim 10 wherein the identifying of a group of contiguous blocks that are adjacent to the identified first block includes:

identifying a forward group of blocks by first searching in the forward direction and then in the backward direction;

identifying a backward group of blocks by first searching in the backward direction and then in the forward direction; and determining whether the forward or the backward group has more blocks.

14. The method of claim 10 wherein the rearranging of the identified blocks includes:

repeating the following until all identified blocks are stored in a destination program image:

selecting an identified block with the largest alignment constraint that has not yet been stored in the destination program image;

when a next address of the destination program image is not an integral multiple of the alignment constraint of the selected block,
choosing one or more blocks not yet stored in the destination program image and any padding necessary to make the next address an integral multiple of the alignment constraint of the selected block; and
storing the chosen one or more blocks and necessary padding in the destination program image; and
storing the selected block in the destination program image.

15. The method of claim 14 wherein the choosing of one or more blocks and necessary padding includes:
iteratively generating subsets of block sizes modulo the alignment constraint of the selected block that can be used to satisfy the alignment constraint of the selected block; and
determining which subset would require the minimum amount of padding to satisfy the alignment constraint of the selected block.

16. The method of claim 15 wherein the iterative generating of subsets generates the subsets in order of increasing cardinality.

17. A method in a computer system for satisfying alignment constraints for a plurality of blocks in memory, the blocks being either polite or rude, a polite block being a block whose size is an integral multiple of its alignment constraint, a rude block being a block whose size is not an integral multiple of its alignment constraint, the method comprising:
repeat the following until each rude block is in a cluster,
selecting a rude block with the largest alignment constraint that is not yet in a cluster;
determining a target alignment to be the maximum of the largest alignment constraint of a rude block that has not yet been selected and of the largest alignment constraint that is less than the alignment constraint of the selected rude block of a polite block that is not yet in a cluster;
choosing blocks that are not yet in a cluster that can be added to the selected rude block to achieve the target alignment;
creating a clusterette from the selected rude block and the chosen polite blocks; and
adding the blocks of the created clusterette to the cluster for the alignment constraint of the selected rude block; and
for each alignment constraint starting with the largest alignment constraint and proceeding in order of descending alignment constraints,
appending to the aligned program image each polite block with the alignment constraint that is not in a cluster; and
appending to the aligned program image the blocks of each clusterette of the cluster of the alignment constraint.

18. The method of claim 17 wherein the choosing of blocks chooses only polite blocks.

19. The method of claim 17 wherein the choosing of blocks also chooses padding as necessary.

20. The method of claim 17 wherein the choosing of blocks selects a fewest number of blocks that result in the need for a minimal amount of padding.

21. The method of claim 17 wherein the choosing of blocks checks subsets of polite blocks in order of increasing cardinality to determine an amount of padding needed with that subset to meet the target alignment.

22. A method in a computer system for aligning blocks of a source program image in accordance with alignment constraints, the source program image being divided in pages, each block having a temporal usage pattern, the method comprising:
for each of the blocks in the source program image not yet stored in a destination program image,
identifying a first block of the source program image that has an alignment constraint;
identifying a plurality of blocks such that the arrangement of the identified blocks can be changed without increasing the temporal usage pattern of any page;
selecting an arrangement of the identified blocks along with any necessary padding to satisfy the alignment constraints of the identified blocks; and
storing the identified blocks in the destination program image in the selected arrangement.

23. The method of claim 22 wherein the selected arrangement includes first arranging blocks and necessary padding to satisfy the largest alignment constraint of an identified block and, until all blocks are arranged, arranging the polite blocks not yet arranged that have the largest alignment constraint followed by rude blocks not yet arranged with the largest alignment constraint, each rude block being followed by arranged blocks and padding to satisfy the largest alignment constraint of a block not yet arranged.

24. The method of claim 22 wherein the identifying of blocks includes reordering blocks so that no block with an alignment constraint crosses a page boundary.

25. A method in a computer system for aligning blocks of a source program image in accordance with alignment constraints, the source program image being divided into pages, the method comprising:
for each of a plurality of time intervals corresponding to an execution of the source program image, receiving an indication of which of the blocks are accessed during that time interval;
for each page, determining from the received indications whether the page is accessed during each time interval; and
repeating the following until all blocks have been aligned,
identifying a block of the source program image that has an alignment constraint;
identifying a group of contiguous blocks that are adjacent to the identified block such that the identified blocks can be rearranged without increasing the number of pages that are accessed during each time interval;
aligning the blocks in the group; and
storing the blocks of the group in a destination program image whereby the blocks within the destination program image are aligned in accordance with their alignment constraints.

26. The method of claim 25 including after a group of contiguous blocks are identified:
when the group of blocks has a certain block that has an alignment constraint and that crosses a page boundary, determining whether the blocks of the group can be reordered so that the certain block does not cross a page boundary; and
when the blocks can be reordered,
reordering the blocks of the group; and
repeating the identifying of a group of contiguous blocks, starting with a block of the reordered group with an alignment constraint.

27. The method of claim 26 wherein the determining of whether the blocks of the group can be reordered so that the certain block does not cross a page boundary includes:

establishing a direction to search;

determining an amount of the certain block that is in the page opposite the established direction;

identifying blocks by searching in the established direction such the sum of the sizes of the identified blocks is greater than the determined amount; and reordering the identified blocks and the certain block so that the certain block does not cross a page boundary.

28. The method of claim 27 wherein the identifying of blocks by searching in the established direction includes disregarding any block that when identified would result in the sum of the sizes of the identified blocks to be greater than a page size.

29. The method of claim 27 wherein the identifying of blocks by searching in the established direction includes disregarding any block with an alignment constraint that when identified would result in the sum of the sizes to be greater than the determined amount.

30. The method of claim 27 including identifying forward blocks by searching in the forward and identifying backward blocks by searching in the backward direction, determining whether the forward blocks or the backwards blocks contain fewer blocks, and reordering the determined identified blocks with the certain block.

31. The method of claim 25 wherein the aligning of the blocks in the group includes:

selecting a block of the group that has the largest alignment constraint of the blocks not yet stored in a destination program image;

when a next address of the destination program image is not an integral multiple of the alignment constraint of the selected block, choosing one or more blocks not yet stored in the destination program image and any padding necessary to make the next address an integral multiple of the alignment constraint of the selected block; and storing the chosen one or more blocks and necessary padding in the destination program image; and storing the selected block in the destination program image.

32. The method of claim 25 wherein the identifying of a group of contiguous blocks that are adjacent to the identified block includes:

identifying a forward group of blocks by first searching in the forward direction and then in the backward direction;

identifying a backward group of blocks by first searching in the backward direction and then in the forward direction; and determining whether the forward or the backward group has more blocks.

33. A method in a computer system for identifying blocks of a program image, the program image being divided into pages, each block having a temporal usage pattern, wherein the identified blocks can be rearranged without increasing the temporal usage pattern of any page, the method comprising:

for each page, determining a temporal usage pattern for each page from the temporal usage pattern of the blocks;

identifying a block of the program image; and for each of a plurality of blocks that are not identified, determining whether the temporal usage pattern of the block is such that, if the block is moved to any page that contains one of the blocks already identified, the temporal usage pattern of no such page would increase;

when the temporal usage pattern of no such page would increase, identifying the block; and when the temporal usage pattern of such a page would increase, not identifying the block whereby the identified blocks can be rearranged without increasing the temporal usage pattern of any page.

34. The method of claim 33 wherein the temporal usage pattern of a block is indicated as a block usage vector with a bit for each of a plurality of time intervals, each bit indicating whether that block is accessed during that time interval and including calculating a region usage vector for the identified blocks, the region usage vector indicating for each time interval whether at least one block on every page that contains an identified block is accessed.

35. The method of claim 34 wherein the determining of whether the temporal usage pattern would increase includes determines that the temporal usage pattern would increase when a bit of the block usage vector of the block is set and the corresponding bit of the region usage vector is not set.

36. A computer-readable medium containing instructions for causing a computer system to align blocks of a program image in accordance with alignment constraints, the program image being divided in pages, by:

for each of a plurality of time intervals during an execution of the program image, receiving an indication of which of the blocks are accessed during that time interval, each page being accessed during each time interval in which a block that it contains is accessed;

identifying a first block that has an alignment constraint;

identifying a plurality of contiguous blocks that are adjacent to the identified first block such that the identified blocks can be rearranged such that a sum of a number of pages accessed during each time interval is not increased; and rearranging the identified blocks to satisfy any alignment constraints of the identified blocks.

37. The computer-readable medium of claim 36 wherein the identifying of a first block, the identifying of the plurality of contiguous blocks, and the rearranging of the identified blocks are repeated for blocks not yet rearranged until all blocks in the program image have their alignment constraints satisfied.

38. The computer-readable medium of claim 36 wherein when the identified blocks contain a certain block with an alignment constraint that crosses a page boundary, reordering the identified blocks so that the certain block no longer crosses a page boundary and repeating the identifying of a first block and of the plurality of contiguous blocks with the reordered blocks.

39. The computer-readable medium of claim 36 wherein the identifying of a group of contiguous blocks that are adjacent to the identified first block includes:

identifying a forward group of blocks by first searching in the forward direction and then in the backward direction;

identifying a backward group of blocks by first searching in the backward direction and then in the forward direction; and determining whether the forward or the backward group has more blocks.

40. The computer-readable medium of claim 36 wherein the rearranging of the identified blocks includes:

repeating the following until all identified blocks are stored in a destination program image:

selecting an identified block with the largest alignment constraint that has not yet been stored in the destination program image;

when a next address of the destination program image is not an integral multiple of the alignment constraint of the selected block, choosing one or more blocks not yet stored in the destination program image and any padding necessary to make the next address an integral multiple of the alignment constraint of the selected block; and storing the chosen one or more blocks and necessary padding in the destination program image; and storing the selected block in the destination program image.

41. The computer-readable medium of claim 36 wherein the choosing of one or more blocks and necessary padding includes:

iteratively generating subsets of block sizes modulo the alignment constraint of the selected block that can be used to satisfy the alignment constraint of the selected block; and determining which subset would require the minimum amount of padding to satisfy the alignment constraint of the selected block.

42. A computer-readable medium containing instructions for causing a computer system to align blocks of a source program image in accordance with alignment constraints, the source program image being divided into pages, by:

for each of a plurality of time intervals corresponding to an execution of the source program image, receiving an indication of which of the blocks are accessed during that time interval;

for each page, determining from the received indications whether the page is accessed during each time interval; and repeating the following until all blocks have been aligned, identifying a block of the source program image that has an alignment constraint;

identifying a group of contiguous blocks that are adjacent to the identified block such that the identified blocks can be rearranged without increasing the number of pages that are accessed during each time interval;

aligning the blocks in the group; and storing the blocks of the group in a destination program image whereby the blocks within the destination program image are aligned in accordance with their alignment constraints.

43. The computer-readable medium of claim 42 wherein the aligning of the blocks in the group includes:

selecting a block of the group that has the largest alignment constraint of the blocks not yet stored in a destination program image;

when a next address of the destination program image is not an integral multiple of the alignment constraint of the selected block, choosing one or more blocks not yet stored in the destination program image and any padding necessary to make the next address an integral multiple of the alignment constraint of the selected block; and storing the chosen one or more blocks and necessary padding in the destination program image; and storing the selected block in the destination program image.

44. The computer-readable medium of claim 42 wherein the identifying of a group of contiguous blocks that are adjacent to the identified block includes:

identifying a forward group of blocks by first searching in the forward direction and then in the backward direction;

identifying a backward group of blocks by first searching in the backward direction and then in the forward direction; and determining whether the forward or the backward group has more blocks.

45. A computer system for aligning blocks of a program image in accordance with alignment constraints, the program image being divided into pages, each block having an indication as to whether it is accessed during each of a plurality of time intervals, comprising:

a select group component that identifies a plurality of blocks that can be rearranged such that a sum of a number of pages accessed during each time interval is not increased;

an alignment component that determines an arrangement of the identified blocks that satisfies their alignment constraints; and a store component that stores the identified block according to the determined arrangement in a destination program image.

46. The computer system of claim 45 wherein the alignment component determines an arrangement such that polite blocks are followed by rude block in decreasing order of alignment constraints.

47. The computer system of claim 46 wherein a rude block is clustered with polite blocks and padding to satisfy the alignment constraint of the next block in the arrangement.

48. The computer system of claim 45 wherein the select group component reorders blocks so that a block with an alignment constraint does not cross a page boundary.

49. The computer system of claim 45 wherein the select group component selects blocks that are contiguous with a block with an alignment constraint.

* * * * *